(12) United States Patent
Orimoto

(10) Patent No.: US 9,258,449 B1
(45) Date of Patent: Feb. 9, 2016

(54) IMAGE PROCESSING APPARATUS, SYSTEM, IMAGE PROCESSING METHOD, AND NON-TRANSITORY COMPUTER READABLE MEDIUM

(71) Applicant: FUJI XEROX CO., LTD., Minato-ku, Tokyo (JP)

(72) Inventor: Asae Orimoto, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/595,434

(22) Filed: Jan. 13, 2015

(30) Foreign Application Priority Data

Sep. 24, 2014 (JP) ................................. 2014-193651

(51) Int. Cl.
*H04N 1/21* (2006.01)
(52) U.S. Cl.
CPC .................................. *H04N 1/2175* (2013.01)
(58) Field of Classification Search
CPC ... G06F 3/1221; G06K 15/4055; G06K 15/02
USPC ................. 358/1.13, 1.15, 1.14, 1.9
See application file for complete search history.

(56) References Cited

U.S. PATENT DOCUMENTS

| 4,498,102 | A | * | 2/1985 | Richard et al. | 348/415.1 |
| 4,982,276 | A | * | 1/1991 | Kawashima et al. | 348/745 |
| 5,091,978 | A | * | 2/1992 | Hirota | 382/323 |
| 5,177,623 | A | * | 1/1993 | Hirota | 358/3.21 |
| 5,475,437 | A | * | 12/1995 | Song | 348/448 |
| 5,502,576 | A | * | 3/1996 | Ramsay et al. | 358/444 |
| 5,713,011 | A | * | 1/1998 | Satoh et al. | 713/501 |
| 8,687,220 | B2 | * | 4/2014 | Kasahara et al. | 358/1.15 |
| 2011/0235716 | A1 | * | 9/2011 | Tanaka et al. | 375/240.16 |
| 2012/0206737 | A1 | * | 8/2012 | Morita | 358/1.2 |
| 2013/0235419 | A1 | * | 9/2013 | Ikeda et al. | 358/1.15 |
| 2015/0022860 | A1 | * | 1/2015 | Nakamura | 358/1.16 |

FOREIGN PATENT DOCUMENTS

JP 2013-256016 A 12/2013

* cited by examiner

*Primary Examiner* — Negussie Worku
(74) *Attorney, Agent, or Firm* — Sughrue Mion, PLLC

(57) ABSTRACT

An image processing apparatus includes a first memory, a reception unit, a storage controller, and an image processing executing unit. The first memory temporarily stores data and the data reading and writing speed of the first memory is higher than that of a second memory. The reception unit receives instruction data indicating the content of image processing that is directed. The storage controller stores the received instruction data in the first memory if an attribute of the received instruction data meets a predetermined condition and, otherwise, stores the received instruction data in the second memory. The image processing executing unit executes the image processing indicated by the stored instruction data.

12 Claims, 16 Drawing Sheets

FIG. 10

C3 → Sheet container is not set.

Number of copies :2 / 3
Number of pages :5 / 10

Monochrome
A4
100%
Sorting

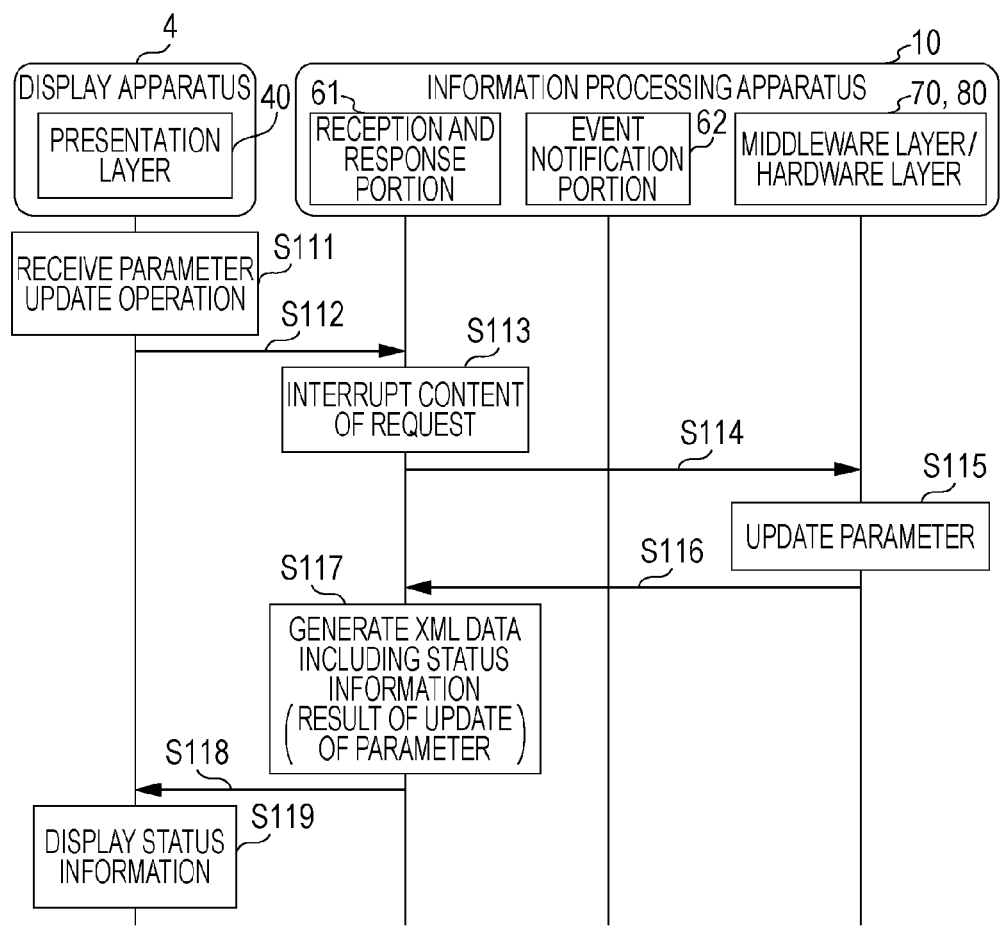

FIG. 16A

```xml
<?xml version="1.0" encoding="UTF-8"?>
    . . .
        <soapENV:Header>
                <jt:JobTemplate jt:version="3.0.7" jt:profile="2">
                        . . .
                                <jt:JobAttributes>
                                        <jt:Name>Copy</jt:Name>
                                        <jt:Categories>
                                                <jt:Category>Copy</jt:Category>
                                        </jt:Categories>
                                </jt:JobAttributes>
                        . . .
                </jt:JobTemplate>
        </soapENV:Header>
        <soapENV:Body>
                . . .
        </soapENV:Body>
</soapENV:Envelope>
```

FIG. 16B

```xml
<?xml version="1.0" encoding="UTF-8"?>
    . . .
        <soapENV:Header>
                <jt:JobTemplate jt:version="3.0.7" jt:profile="2">
                        . . .
                                <jt:JobAttributes>
                                        <jt:Name>Copy</jt:Name>
                                        <jt:Categories>
                                                <jt:Category>Copy</jt:Category>
                                        </jt:Categories>
                                        <jt:Framework>StandardJob</jt:Framework>
                                </jt:JobAttributes>
                        . . .
                </jt:JobTemplate>
        </soapENV:Header>
        <soapENV:Body>
                . . .
        </soapENV:Body>
</soapENV:Envelope>
```

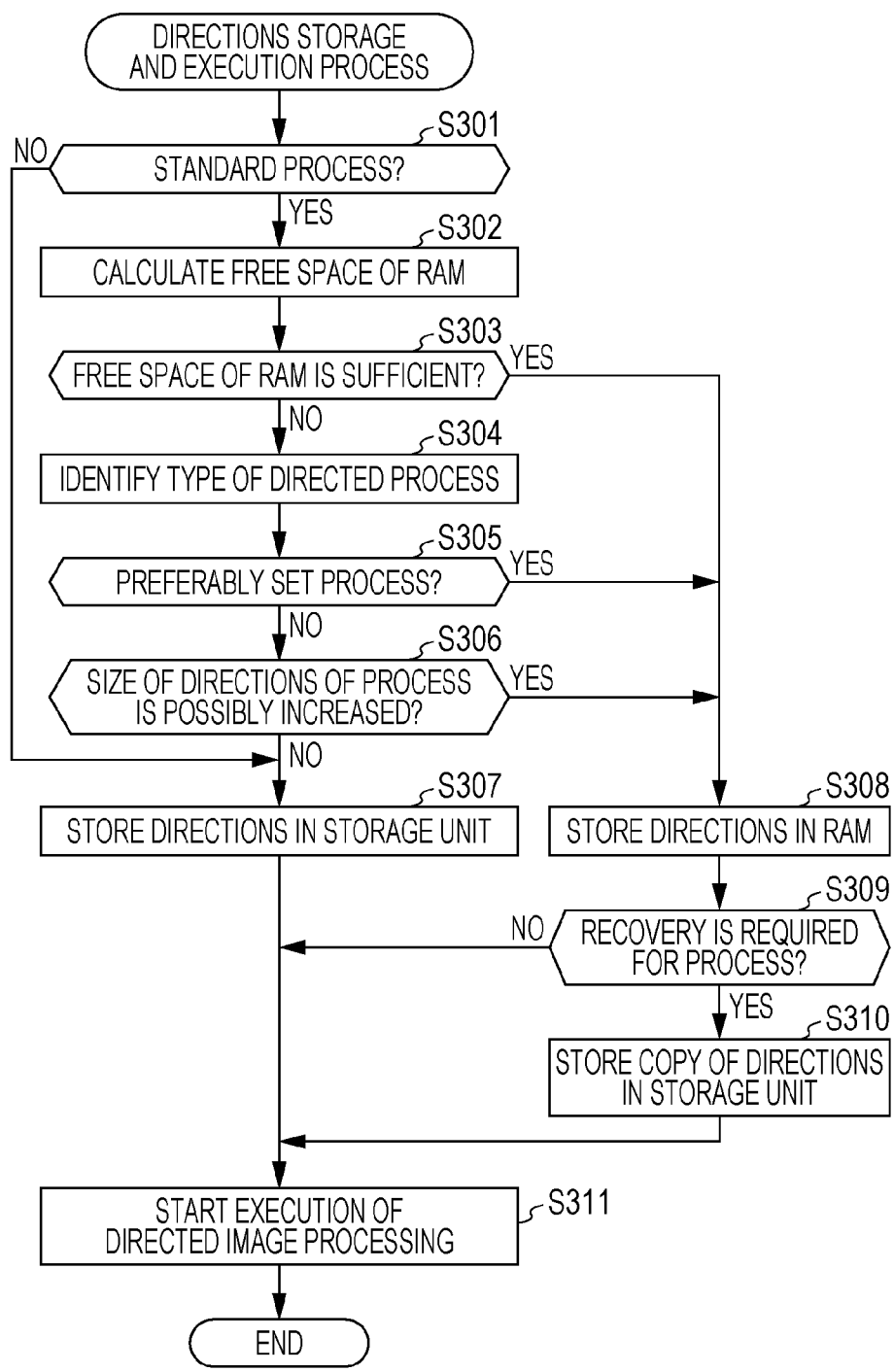

| TIME ZONE | TYPE |
|---|---|
| 7:00-9:00 | FACSIMILE |
| xx:00-xx:00 | ... |
| xx:00-xx:00 | ... |
| ⋮ | ⋮ |

IMAGE PROCESSING APPARATUS, SYSTEM, IMAGE PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-193651 filed Sep. 24, 2014.

BACKGROUND

Technical Field

The present invention relates to an image processing apparatus, a system, an image processing method, and a non-transitory computer readable medium.

SUMMARY

According to an aspect of the invention, there is provided an image processing apparatus including a first memory, a reception unit, a storage controller, and an image processing executing unit. The first memory temporarily stores data and the data reading and writing speed of the first memory is higher than that of a second memory. The reception unit receives instruction data indicating the content of image processing that is directed. The storage controller stores the received instruction data in the first memory if an attribute of the received instruction data meets a predetermined first condition and, otherwise, stores the received instruction data in the second memory. The image processing executing unit executes the image processing indicated by the stored instruction data.

BRIEF DESCRIPTION OF THE DRAWINGS

Exemplary embodiments of the present invention will be described in detail based on the following figures, wherein:

FIG. 10 illustrates an example of the status information that is displayed;

FIG. 12 is a sequence diagram illustrating an exemplary operation of the respective apparatuses when a first method is used;

FIGS. 16A and 16B illustrate exemplary directions;

FIG. 17 is a flowchart illustrating an exemplary directions storage and execution process;

DETAILED DESCRIPTION

[1] Exemplary Embodiments

An entire configuration, hardware configurations, and a functional configuration of an information processing system according to exemplary embodiments will herein be described with reference to FIG. 1 to FIG. 11.

[1-1] Entire Configuration

Figure 1:
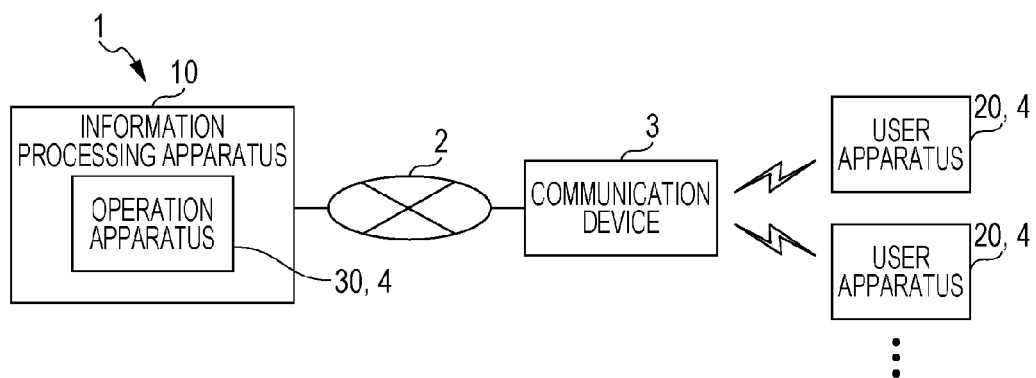
FIG. 1 is a block diagram illustrating an example of the entire configuration of an information processing system according to an exemplary embodiment.

FIG. 1 is a block diagram illustrating an example of the entire configuration of an information processing system according to an exemplary embodiment. Referring to FIG. 1, an information processing system 1 includes a communication line 2, a communication device 3, an information processing apparatus 10, and multiple user apparatuses 20. The information processing system 1 of the present exemplary embodiment is a system that provides functions including a copy function, a scan function, a facsimile (FAX) function, and a print function (output of image data on a medium) to a user.

The communication line 2 is a system for communication and includes at least one of, for example, the Internet, a mobile communication network, and a telephone line. The communication line 2 mediates the communication between the apparatuses connected to the communication line 2. The information processing apparatus 10 and the communication device 3 are connected to the communication line 2. The communication device 3 has a communication function and performs wireless communication according to a wireless local area network (LAN) standard in the present exemplary embodiment. The communication device 3 performs the wireless communication with each user apparatus 20 and communicates with the information processing apparatus 10 via the communication line 2. In other words, the information processing apparatus 10 communicates with the user apparatus 20 via the communication line 2 and the communication device 3.

The information processing apparatus 10 performs, for example, an image forming process to form an image on a medium and an image reading process to read an image formed on a medium. These processes are executed when the copy function, the scan function, the FAX function, the print function, or the like described above is provided to the user.

The information processing apparatus 10 includes an operation apparatus 30 used to operate the information processing apparatus 10. The operation apparatus 30 is an apparatus to operate the information processing apparatus 10 and is a so-called control panel. The operation apparatus 30 is fixed to a housing of the information processing apparatus 10 and is used by the user who is at the position where the information processing apparatus 10 is placed. The operation apparatus 30 includes, for example, a liquid crystal display and displays an image to operate the information processing apparatus 10 (such an image is hereinafter referred to as an "operation image"). The operation image will now be described with reference to FIG. 2.

Figure 2:
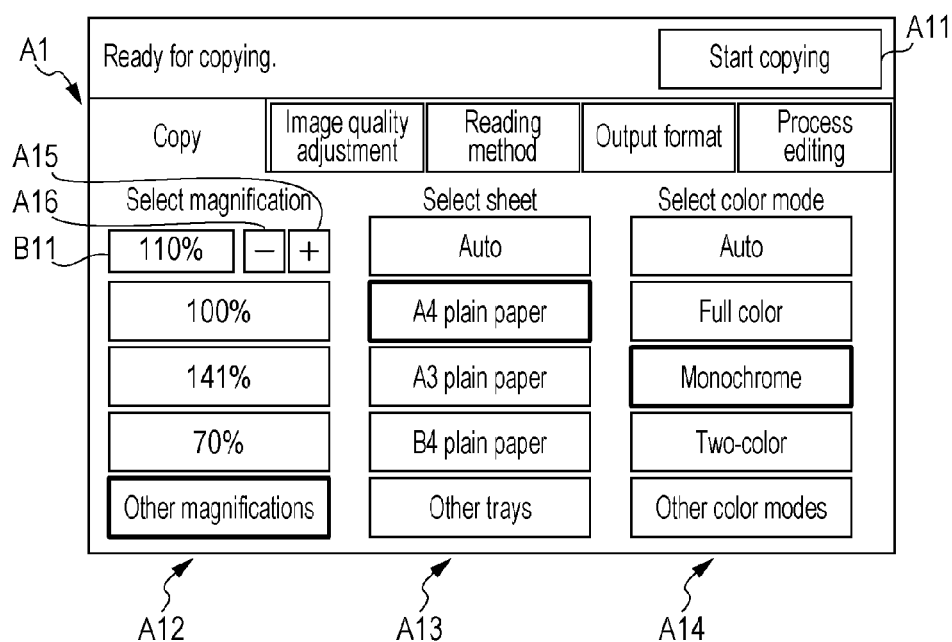
FIG. 2 illustrates exemplary operation images that are displayed.

FIG. 2 illustrates exemplary operation images displayed in the operation apparatus 30. An operation image group A1 displayed for using the copy function is illustrated in the example in FIG. 2. The operation image group A1 includes, for example, an operation image A11 to start the copying. The user lightly taps the operation image A11 to perform the operation corresponding to the operation image A11, that is, the operation to start the copying. In response to the operation on the operation image that is displayed, the operation apparatus 30 submits a request for the process corresponding to the operation to the information processing apparatus 10. When the operation image A11 is operated, the operation apparatus 30 requests the information processing apparatus 10 to execute processes to provide the copy function (specifically, a series of processes including the image reading process and the image forming process: the series of processes is hereinafter referred to as a "copy process").

Referring back to FIG. 1, each user apparatus 20 is, for example, a tablet terminal or a personal computer. The user apparatus 20 may be carried by the user for usage or may be placed on a desk for usage. The user apparatus 20 is not limitedly used for the operation of the information processing apparatus 10 and may be used for other applications (for example, a business in a company). The user apparatus 20 is similar to the operation apparatus 30 in that the user apparatus 20 displays the operation image and, in response to an operation based on the displayed operation image, requests the information processing apparatus 10 to execute the process corresponding to the operation.

Upon execution of the process in response to the request from the operation apparatus 30 or the user apparatus 20, the information processing apparatus 10 transmits information indicating the status of the process that is being executed (such information is hereinafter referred to as "status information") to the operation apparatus 30 or the user apparatus 20 to notify the operation apparatus 30 or the user apparatus 20 of the status of the process. The status information indicates the number of media from which images are read, the number of media on which images are formed, and so on, for example, when the copy function is used.

Figure 3A:
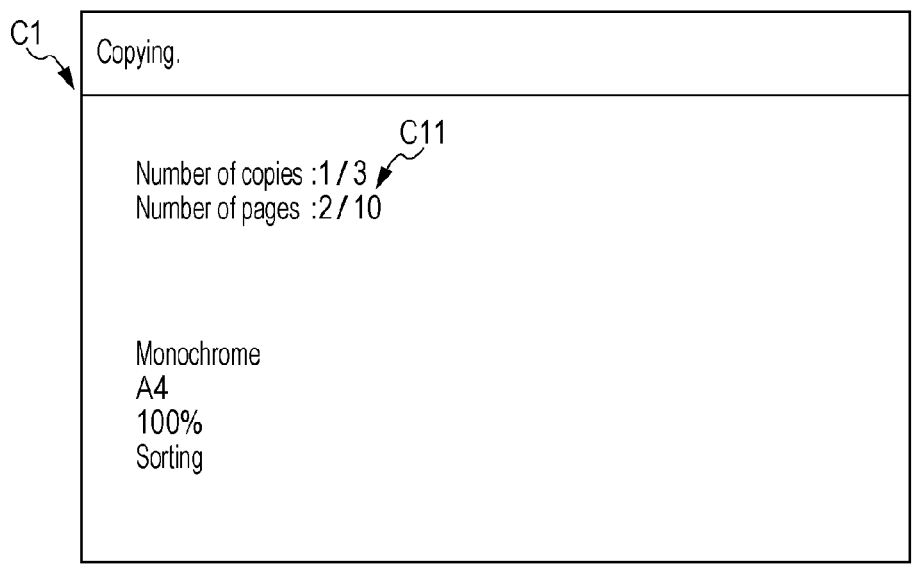
FIGS. 3A and 3B illustrate exemplary pieces of status information that are displayed.
Figure 3B:
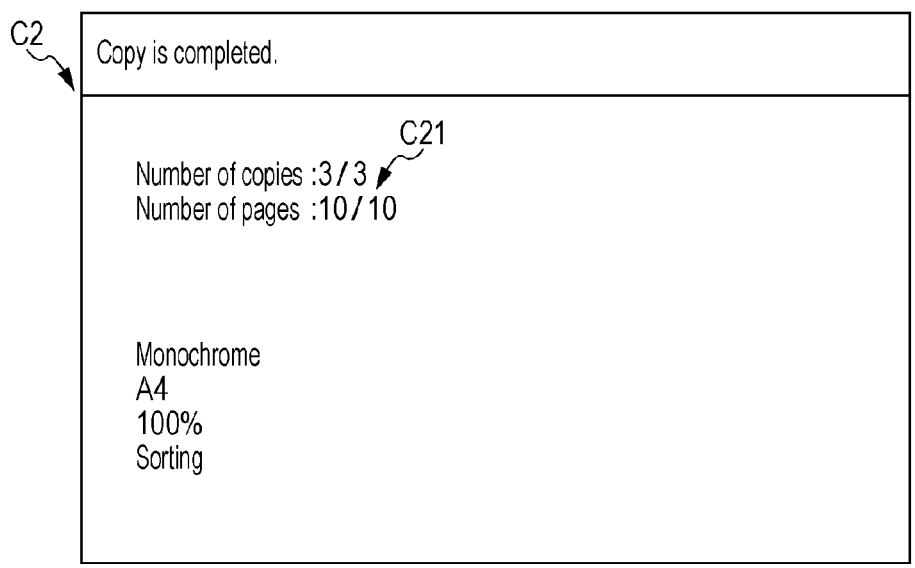

FIGS. 3A and 3B illustrate exemplary pieces of status information that are displayed. For example, when the copy process is executed, the information processing apparatus 10 transmits status information C1. The status information C1 includes number information C11 indicating the number of copies and the number of pages for which the copying is completed, a character string "Copying", and copy parameters, such as "Monochrome", "A4", "100%", and "Sorting", as illustrated in FIG. 3A.

When the copy process advances and the copying of the requested number of copies is completed, the information processing apparatus 10 transmits status information C2. The status information C2 includes number information C21 indicating that the copying of the requested number of copies is completed, a character string "Copy is completed.", and so on, as illustrated in FIG. 3B. The number information C11 and the number information C21 are each represented by a fraction using the requested number of copies as a denominator and the number of copies for which the copying is completed as a numerator. As described above, the status information includes the information indicating the progress of the process, the information indicating the result of the process, the information about the parameters used for the process, and so on. Each of the operation apparatus 30 and the user apparatus 20 is also a display apparatus that displays the status that is indicated in the manner illustrated in FIGS. 3A and 3B. When the operation apparatus 30 and the user apparatus 20 are not discriminated from each other, the operation apparatus 30 and the user apparatus 20 are each hereinafter referred to as a display apparatus 4.

[1-2] Hardware Configurations

Figure 4:
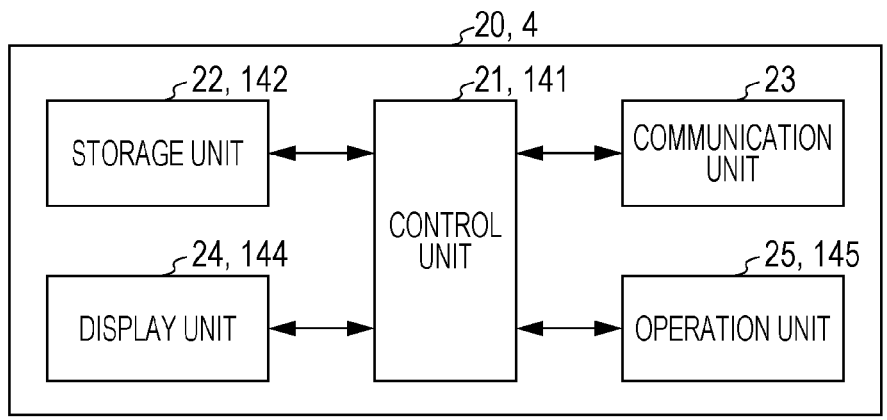
FIG. 4 is a block diagram illustrating an exemplary hardware configuration of a user apparatus.

FIG. 4 is a block diagram illustrating an exemplary hardware configuration of the user apparatus 20. Referring to FIG. 4, the user apparatus 20 includes a control unit 21, a storage unit 22, a communication unit 23, a display unit 24, and an operation unit 25. The control unit 21 includes a central processing unit (CPU), a read only memory (ROM), a random access memory (RAM), and a real-time clock (which are not illustrated in FIG. 4). The CPU executes a program stored in the ROM or the storage unit 22 using the RAM as a working area and controls the operation of each component. The real-time clock calculates the current date and time and notifies the CPU of the current date and time.

The storage unit 22 includes, for example, a hard disk drive and stores data and programs used by the control unit 21 for control, image data, and so on. The communication unit 23 is a communication unit including a communication circuit and an antenna for performing the wireless communication according to the wireless LAN standard. The communication unit 23 performs the wireless communication with, for example, the communication device 3 illustrated in FIG. 1. The display unit 24 includes, for example, a liquid crystal display. The display unit 24 displays an image on a display screen under the control of the control unit 21. For example, when the user apparatus 20 is the tablet terminal, the operation unit 25 includes a touch sensor (also referred to as a touch screen or a touch panel) superposed on the display screen and buttons provided on the housing. Upon reception of an operation, such as a tapping, by the user, the operation unit 25 supplies operation data indicating the content of the operation to the control unit 21. When the user apparatus 20 is the personal computer, the operation unit 25 may include a keyboard and a mouse. The control unit 21 performs the control in accordance with the operation data that is supplied.

Figure 5:
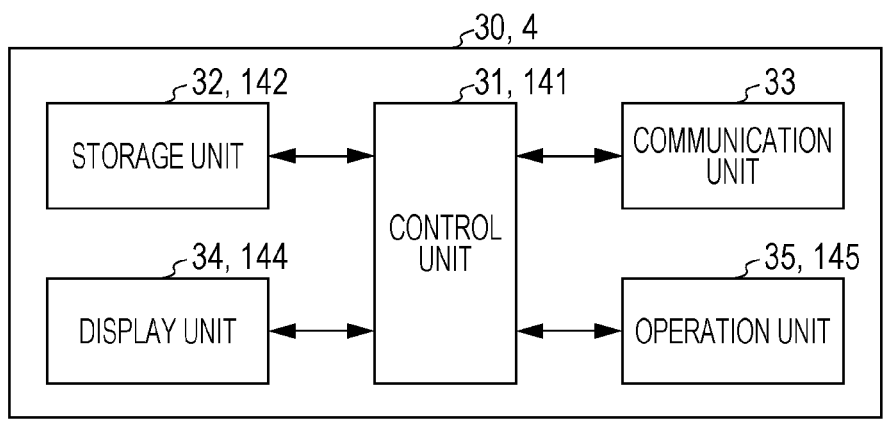
FIG. 5 is a block diagram illustrating an exemplary hardware configuration of an operation apparatus.

FIG. 5 is a block diagram illustrating an exemplary hardware configuration of the operation apparatus 30. Referring to FIG. 5, the operation apparatus 30 includes a control unit 31, a storage unit 32, a communication unit 33, a display unit 34, and an operation unit 35. Common names are given to the blocks (the components excluding the communication unit 33) representing hardware common to the hardware of the blocks illustrated in FIG. 4. A description of such blocks is omitted herein. The communication unit 33 is a communication unit that includes a communication circuit for performing communication according to a wired LAN standard and a port for receiving a connector of a communication cable (specifically, a LAN cable).

As described above, when the operation apparatus 30 and the user apparatus 20 are not discriminated from each other, the operation apparatus 30 and the user apparatus 20 are each referred to as the display apparatus 4. In association with this, when it is not necessary to discriminate the control unit 31 and the control unit 21 from each other, the control unit 31 and the control unit 21 are each referred to as a "control unit 141." When it is not necessary to discriminate the storage unit 32 and the storage unit 22 from each other, the storage unit 32 and the storage unit 22 are each referred to as a "storage unit 142." When it is not necessary to discriminate the display unit 34 and the display unit 24 from each other, the display unit 34 and the display unit 24 are each referred to as a "display unit 144." When it is not necessary to discriminate the operation unit 35 and the operation unit 25 from each other, the operation unit 35 and the operation unit 25 are each referred to as an "operation unit 145."

Figure 6:
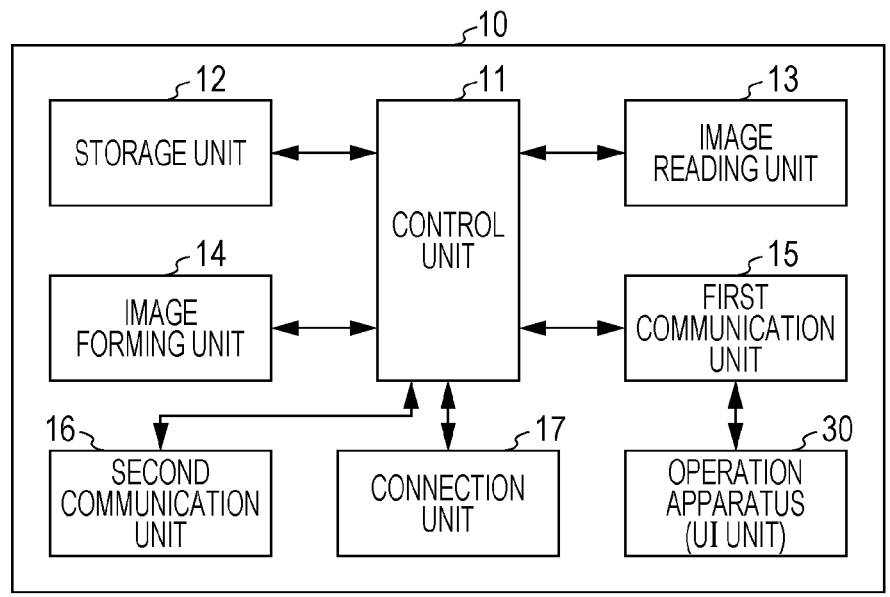
FIG. 6 is a block diagram illustrating an exemplary hardware configuration of an information processing apparatus.

FIG. 6 is a block diagram illustrating an exemplary hardware configuration of the information processing apparatus 10. Referring to FIG. 6, the information processing apparatus 10 includes a control unit 11, a storage unit 12, an image reading unit 13, an image forming unit 14, a first communication unit 15, a second communication unit 16, and a connection unit 17. Common names are given to the blocks (the control unit 11 and the storage unit 12) representing hardware common to the hardware of the blocks illustrated in FIG. 4 and FIG. 5. A description of such blocks is omitted herein. The information processing apparatus 10 also includes the operation apparatus 30 described above, which functions as a user interface (UI) unit. The control unit 11 controls the components excluding the operation apparatus 30 in the present exemplary embodiment.

The image reading unit 13 performs the image reading process to read out an image drawn on a document using, for example, a charge coupled device (CCD) method. The image reading unit 13 optically reads out an image of content formed on a medium, such as a sheet of paper, and supplies the image data representing the image that is read out to the control unit 11. The image forming unit 14 performs the image forming process to form an image on a medium using, for example, an electrophotographic method. The image forming unit 14 forms an image indicated by the image data supplied from the control unit 11 on a medium, such as a sheet of paper. The method used for reading out an image and the method used for forming an image are only examples and other methods may be used.

The first communication unit 15 includes a communication circuit for performing the communication according to the wired LAN standard and a port for receiving a connector of a communication cable (LAN cable). The first communication unit 15 performs a communication process to communicate with an apparatus connected via the cable. The first communication unit 15 is connected to the communication line 2 illustrated in FIG. 1 and communicates with, for example, the user apparatus 20 via an external apparatus (the external apparatus for the information processing apparatus 10) (for example, the communication device 3). The first communication unit 15 is also connected to the communication unit 33 in the operation apparatus 30 via the communication cable and communicates with the operation apparatus 30 not via the external apparatus described above. In other words, the communication unit 33 also communicates with the information processing apparatus 10 not via the external apparatus described above.

The second communication unit 16 includes a communication circuit for performing FAX communication and executes a process to exchange FAX data, that is, a FAX communication process. The connection unit 17 includes, for example, a slot to which a storage medium, such as a secure digital (SD) memory card, is connected and is connected to the storage medium using the slot. The control unit 11 reads out data stored in the storage medium and writes data to the storage medium via the connection unit 17. The operation apparatus 30 has the configuration described above with reference to FIG. 5 and communicates with the first communication unit 15. The operation apparatus 30 performs the communication with the first communication unit 15 and thus functions as, for example, the UI unit, which displays an image indicated by the data transmitted from the control unit 11 and transmits the data to operate the information processing apparatus 10 to the control unit 11.

[1-3] Functional Configuration

Figure 7:
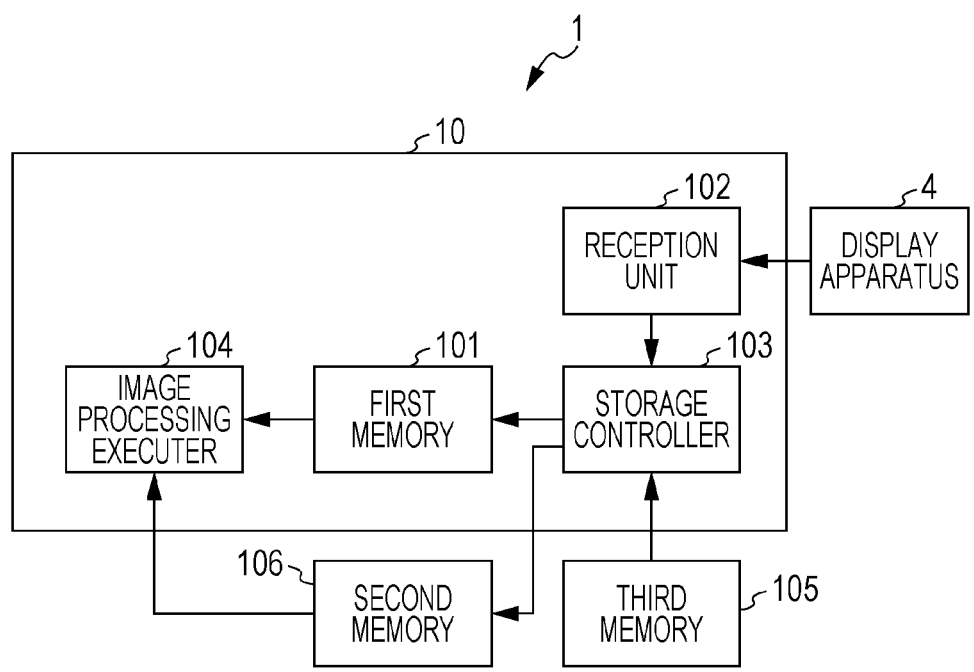
FIG. 7 is a block diagram illustrating an exemplary functional configuration of the information processing system.

FIG. 7 is a block diagram illustrating an exemplary functional configuration of the information processing system 1. Referring to FIG. 7, the information processing system 1 includes the information processing apparatus 10 (an example of an image processing apparatus) and the display apparatus 4 (that is, the operation apparatus 30 or the user apparatus 20) (an example of an operation apparatus)). The information processing apparatus 10 includes a first memory 101, a reception unit 102, a storage controller 103, and an image processing executer 104. The first memory 101 temporarily stores data. The speed of writing and reading data of the first memory 101 is higher than that of a second memory 106. The reception unit 102 receives from the display apparatus 4 instruction data indicating the content of the image processing that is directed. The storage controller 103 stores the received instruction data in the first memory 101 if the attribute of the instruction data received by the reception unit 102 meets a predetermined condition. The storage controller 103 stores the received instruction data in the second memory 106 if the attribute of the instruction data received by the reception unit 102 does not meet the predetermined condition. The image processing executer 104 executes the image processing indicated by the instruction data stored in the first memory 101 or the second memory 106. A third memory 105 stores image processing types and time zones in association with each other.

In the example in FIG. 7, the control unit 11 or the control unit 11 and the first communication unit 15 in the information processing apparatus 10 are examples of the reception unit 102, the storage controller 103, and the image processing executer 104. A RAM in the control unit 11 is an example of the first memory 101. The storage unit 12 or the storage medium (a memory card, an SD card, etc.) connected to the connection unit 17 is an example of the second memory 106 and the third memory 105.

[1-4] Hierarchical Structure

Figure 8:
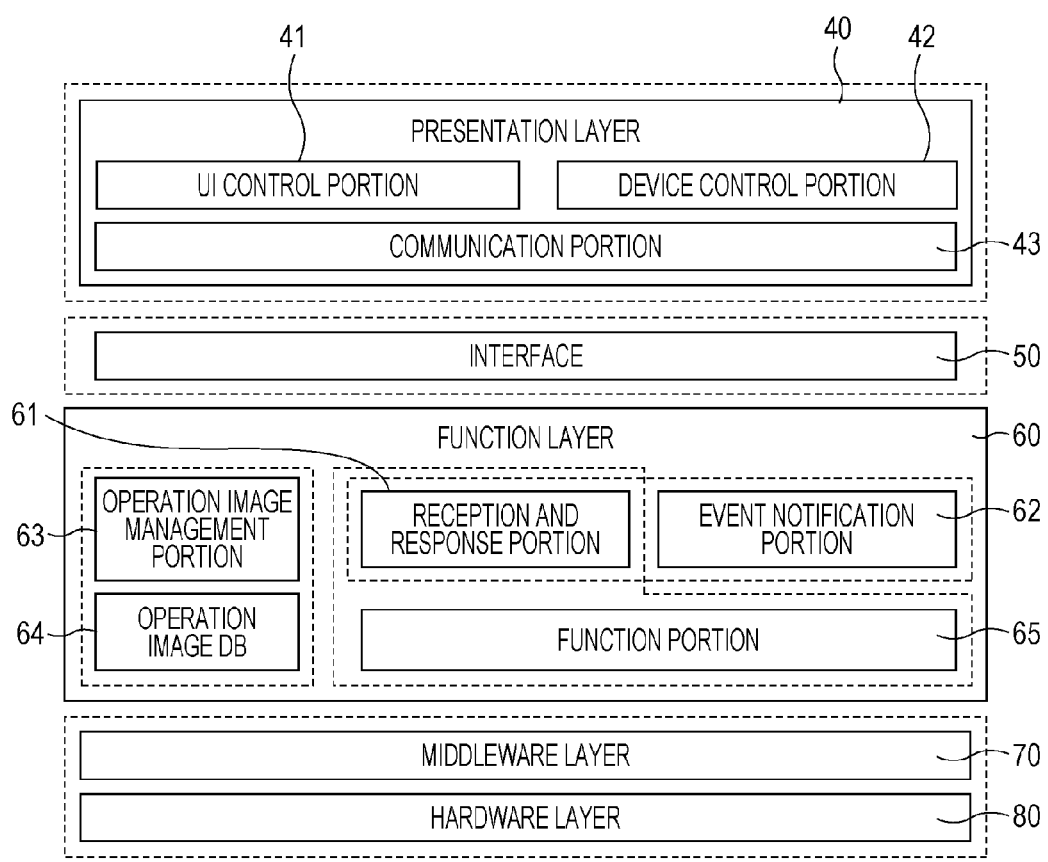
FIG. 8 illustrates an exemplary hierarchical structure representing the configuration of the information processing system.

FIG. 8 illustrates an exemplary hierarchical structure representing the configuration of the information processing system 1. Referring to FIG. 8, the information processing system 1 includes a presentation layer 40, an interface 50, a function layer 60, a middleware layer 70, and a hardware layer 80. The presentation layer 40 is realized by the programs stored in the storage unit 142 being executed by the control unit 141 in the display apparatus 4 (that is, the operation apparatus 30 and the user apparatus 20). The presentation layer 40 is an example of software functioning as a Web client. The interface 50, the function layer 60, and the middleware layer 70 are realized by the programs stored in the storage unit 12 being executed by the control unit 11 in the information processing apparatus 10. At least one of the interface 50, the function layer 60, and the middleware layer 70 is an example of software functioning as a Web server. The hardware layer 80 is a collection of hardware resources in the information processing apparatus 10 and is controlled by the middleware layer 70.

In the present exemplary embodiment, the presentation layer 40 (that is, the display apparatus 4) communicates with the interface 50 (that is, the information processing apparatus 10) according to a World Wide Web (WWW) (hereinafter referred to as a "Web") standard. In the example in FIG. 8, the presentation layer 40 communicates with the interface 50 according to Hypertext Transfer Protocol (HTTP) and Web-Socket.

When the display apparatus 4 is the user apparatus 20, the information processing apparatus 10 and the user apparatus 20 (that is, the interface 50 and the presentation layer 40) exchange data via the communication line 2 and the communication device 3, as described above with reference to FIG. 1. Specifically, in this case, the communication is performed via communication devices that are not the information processing apparatus 10 and the user apparatus 20 (for example, the communication device 3 and a communication device of the communication line 2) (hereinafter referred to as "other communication devices"). In contrast, when the display apparatus 4 is the operation apparatus 30, the information processing apparatus 10 and the operation apparatus 30 (that is, the interface 50 and the presentation layer 40) exchange data via the cable connected to the first communication unit 15 described above with reference to FIG. 6. Specifically, in this case, the communication is performed not via the other communication devices. The other communication devices include, for example, a router and a hub of the communication line 2 and a bridge, in addition to the communication device 3. Even when the communication line 2 does not have the router and so on, the other communication devices at least include the communication device 3.

[1-4-1] Presentation Layer

The presentation layer 40 realized by the operation apparatus 30 and the user apparatus 20 realizes a function to receive an operation by the user (a so-called user interface). The presentation layer 40 includes a UI control portion 41, a device control portion 42, and a communication portion 43. The UI control portion 41 is a portion that controls the user interface. The UI control portion 41 displays the operation image and/or the status information described above, which is transmitted from the interface 50 (that is, the information processing apparatus 10), in the display unit 144 and receives an operation by the user in accordance with the data supplied from the operation unit 145. Specifically, for example, the UI control portion 41 displays the status information C1 and the status information C2 illustrated in FIG. 3A and FIG. 3B, respectively. Other examples of the status information will now be described with reference to FIG. 10 and FIGS. 11A and 11B.

FIG. 10 illustrates an example of the status information that is displayed. In the example in FIG. 10, the status information displayed when a container storing the medium is opened by the user is displayed. Specifically, status information C3 including a character string "Sheet container is not set." is displayed.

Figure 11A:
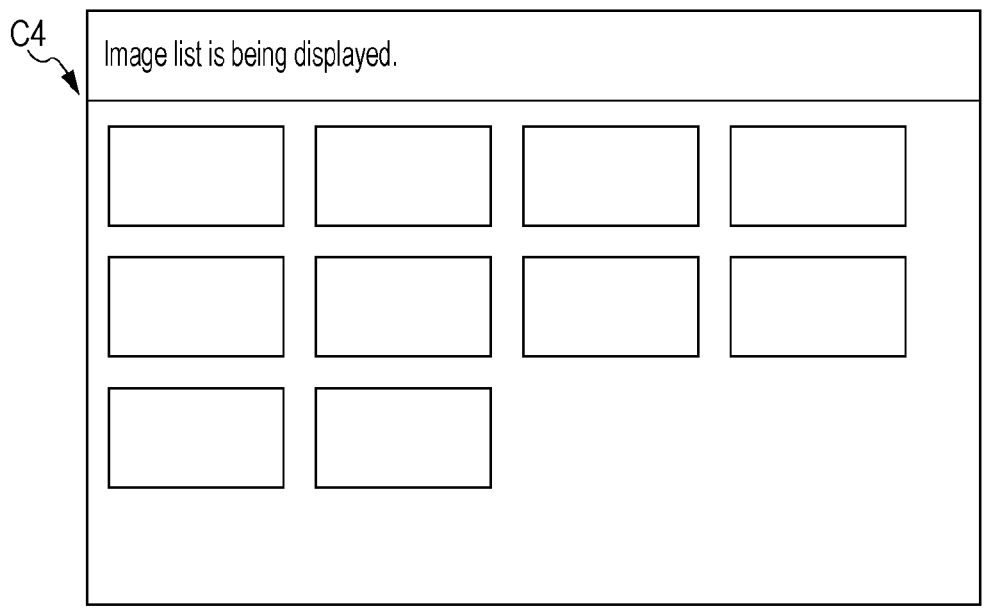
FIGS. 11A and 11B illustrate other examples of the status information that is displayed.
Figure 11B:
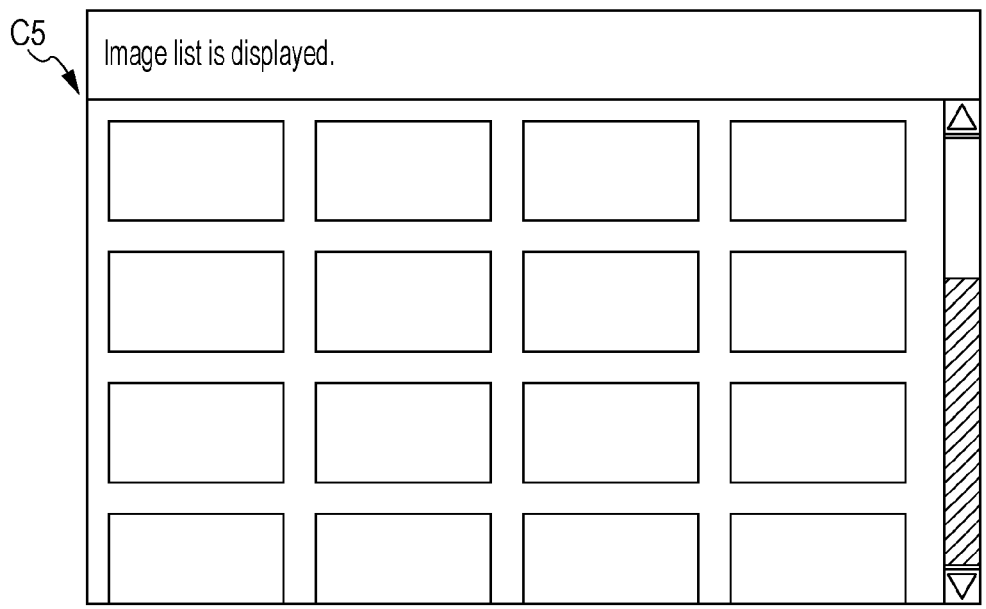

FIGS. 11A and 11B illustrate other examples of the status information that is displayed. The status and the result of the process to display a list of thumbnail images of the images stored in the storage medium when the storage medium, such as an SD memory card storing multiple images is connected to the connection unit 17 in the information processing apparatus 10 illustrated in FIG. 6 are displayed in the examples in FIGS. 11A and 11B. In the example in FIG. 11A, status information C4 is displayed, which includes a character string "Image list is being displayed." and the thumbnail images (ten thumbnail images in the example in FIG. 11A) generated from the images that have been read. In the example in FIG. 11B, status information C5 is displayed, which includes a character string "Image list is displayed." and the list of the thumbnail images generated from all the images that have been read out from the storage medium.

The UI control portion 41 transmits a request for the operation image (hereinafter referred to as an "operation image request") to the interface 50 of the information processing apparatus 10, for example, in response to an operation to access a uniform resource locator (URL) of the information processing apparatus 10 by the user. In addition, the UI control portion 41 displays the operation image indicated by data representing the operation image (hereinafter referred to as "operation image data"), which is transmitted from an operation image management portion 63 in the information processing apparatus 10 as a response to the transmitted operation image request, in the display unit 144. More specifically, the UI control portion 41 displays the operation image on the basis of the parameters of the arrangement, the size, and so on of the operation image indicated by the operation image data. The operation images displayed in the above manner correspond to, for example, the operation image group A1 illustrated in FIG. 2.

Referring to FIG. 2, the operation image group A1 includes operation images A12 to A14 used by the user to select the parameters including the magnification of the image to be copied, the sheet on which the copied image is to be formed, and the color mode of the copied image. The UI control portion 41 displays images (such images are hereinafter referred to as "parameter transmission images") to transmit to the user the content of the parameters selected by the user with the operations of the operation images. In the example in FIG. 2, the parameter transmission images include an image B11 including a character string representing the magnification of the copy which is currently selected ("110%" in the example in FIG. 2) and the operation images that represent the magnification of the copy, the sheet, and the color mode which are currently selected (the operation images in which character strings "Other magnifications", "A4 plain paper", and "monochrome" are drawn in the example in FIG. 2) and that are represented in a mode different from the mode of the operation images that are not selected (in a mode in which the line is thickened in the example in FIG. 2) (a highlight mode or a mode using a radio button may be used).

The operation image group A1 includes the operation image A11 to start the copying. In response to an operation of the operation image A11, the function layer 60 is requested to perform the copy process using the parameters selected at that time via the interface 50. An image used to determine the content which is requested of the information processing apparatus 10, like the operation image A11, is hereinafter referred to as a "content-of-request determining image."

Referring back to FIG. 8, the UI control portion 41 supplies data concerning each operation image that is displayed to the device control portion 42. The data concerning the operation image is used to determine whether the operation image is operated. For example, the data concerning the operation image indicates an area where the operation image is displayed (such an area is hereinafter referred to as an "operation image area"). In addition, the UI control portion 41 supplies data concerning the displayed parameter transmission images to the device control portion 42. The data concerning the parameter transmission images indicates the content of the parameters transmitted with the parameter transmission images.

The device control portion 42 requests the function layer 60 to execute the process via the interface 50 on the basis of the operation by the user. In response to an operation of the operation image by the user, the device control portion 42 requests the information processing apparatus 10 to execute the process corresponding to the operation by the user on the basis of the data supplied from the UI control portion 41. For example, when the user taps the touch sensor of the operation unit 145, the device control portion 42 determines whether the tapped position is included in the operation image area on the basis of the data supplied from the UI control portion 41. If the device control portion 42 determines that the tapped position is included in the operation image area, the device control portion 42 accepts the operation of the operation image displayed in the operation image area.

When an operation of the content-of-request determining image described above (an operation of the operation image A11 in the example in FIG. 2) is accepted, the device control portion 42 requests the information processing apparatus 10 to execute the process indicated by the content-of-request determining image using the parameters indicated by the data concerning the parameter transmission images supplied from the UI control portion 41. When the operation of the operation image A11 is performed in the state illustrated in FIG. 2, the device control portion 42 requests the information processing apparatus 10 to execute the monochrome copy on the A4 plain paper at a magnification of 110%.

In the above example, the device control portion 42 generates the instruction data in which an instruction to execute the process corresponding to the content-of-request determining image that is operated (the copy process in the example in FIG. 2) using the parameters transmitted with the parameter transmission images is described (such instruction data is hereinafter referred to as "directions"). In the present exemplary embodiment, data described in Extensible Markup Language (XML) (hereinafter referred to as "XML data") is used as the directions. The device control portion 42 generates an HTTP request including the generated XML data. The device control portion 42 transmits the generated HTTP request to the interface 50 and requests the function layer 60 to execute the process. The HTTP request transmitted to the interface 50 by the device control portion 42 to request the process is hereinafter referred to as a "process request." Although the process request including the directions is generated when the copy process is requested, the directions may not be included in the process request depending on the process that is requested. For example, when a process to turn off the information processing apparatus 10 is requested, the directions are not included in the process request.

The communication portion 43 controls the communication between the interface 50 and the UI control portion 41 and device control portion 42.

[1-4-2] Interface 50

The interface 50 is a layer that realizes a function to intermediate the connection between the presentation layer 40 and the function layer 60. The connection between the presentation layer 40 and the interface 50 may be performed via the external apparatus, such as the communication device 3 illustrated in FIG. 1, having the communication function (the connection to the user apparatus 20) or may be performed not via the external apparatus (the connection to the operation apparatus 30). The interface 50 intermediates the communication with the user apparatus 20 and the operation apparatus 30 according to a common communication procedure (a communication procedure according to, for example, the HTTP or the WebSocket). For example, the interface 50 receives the HTTP request transmitted from the presentation layer 40 to supply the HTTP request to the function layer 60 or receives an HTTP response to the HTTP request, supplied from the function layer 60, to transmit the HTTP response to the presentation layer 40.

[1-4-3] Function Layer 60

The function layer 60 is a layer that realizes a function such as the copy function or the scan function to process data for a desired application. The function layer 60 includes a reception and response portion 61, an event notification portion 62, the operation image management portion 63, an operation image database (DB) 64, and a function portion 65 that provides the copy function, the scan function, and so on.

The reception and response portion 61 receives the process request transmitted from the presentation layer 40 via the interface 50 and requests the function portion 65 to execute the process. At this time, the reception and response portion 61 issues a transaction identifier (ID) as information for identifying the requested process. In addition, the reception and response portion 61 issues a client ID as information for identifying the requester (the display apparatus 4) of the process. The reception and response portion 61 stores the transaction ID and the client ID, which are issued, and the communication destination of the display apparatus 4, which is the requester, in the storage unit 12 in association with each other. The reception and response portion 61 supplies the issued transaction ID to the function portion 65 when the reception and response portion 61 requests the process of the function portion 65. In addition, the reception and response portion 61 transmits a response to the received request to the presentation layer 40 via the interface 50. The response may only indicate that the request is received or may include the status information.

The event notification portion 62 generates the XML data including the status information and includes the generated XML data in the data according to the WebSocket to transmit the XML data included in the data according to the WebSocket to the presentation layer 40 via the interface 50.

In the present exemplary embodiment, the function layer 60 and the presentation layer 40 transmit the request, the response, or the notification using roughly four methods. A first method and a second method use the HTTP and are performed by the reception and response portion 61. A third method uses both the HTTP and the WebSocket protocol and is performed by cooperation of the reception and response portion 61 and the event notification portion 62. A fourth method uses the WebSocket protocol to transmit the notification and is performed by the event notification portion 62.

In the first method, upon reception of the process request (the HTTP request) from the presentation layer 40, the reception and response portion 61 waits for completion of the execution of the process by the middleware layer 70 and the hardware layer 80. In this case, upon notification of the completion of the process from the middleware layer 70, the reception and response portion 61 transmits the HTTP response including the status information indicating the status when the process is completed to the presentation layer 40 from which the process has been requested. Specifically, for example, when a "+" operation image A15 or a "−" operation image A16 in the "Select magnification" field in FIG. 2 is operated by the user, a process to decrease or increase the parameter of the magnification of the copy is requested from the presentation layer 40. In response to the request for the process, the reception and response portion 61 transmits the response including the value of the parameter, which is varied as the result of the execution of the requested process, to the presentation layer 40.

In the second method, upon reception of the process request (the HTTP request) from the presentation layer 40, the reception and response portion 61 transmits the response (the HTTP response) indicating that the process request is received without waiting for completion of the requested process. Then, the status information is acquired by the presentation layer 40 through so-called polling according to the HTTP. Specifically, upon reception of a request for notification of the status of the process (hereinafter referred to as a "notification request") from the presentation layer 40, the reception and response portion 61 transmits the response to the notification request. When the response is transmitted with the second method, for example, the number information C11 illustrated in FIG. 3A is indicated not each time the copied image is formed on the medium but each time the polling is performed for display. Accordingly, for example, the number of pages may be incremented not by one but by multiple pages.

As described above, when the first method and the second method are used, the reception and response portion 61 transmits the response to the request upon reception of the request (the process request or the notification request) from the presentation layer 40. Specifically, the reception and response portion 61 transmits the result of the process as the response to the process request to the presentation layer 40, which is the requester, when the first method is used. The reception and response portion 61 transmits the result of the process and the statuses of other processes as the response to the notification request received after the response to the process request to the presentation layer 40, which is the requester, when the second method is used.

In the third method, upon reception of the process request (the HTTP request) from the presentation layer 40, the reception and response portion 61 transmits the response (the HTTP response) indicating that the process request has been received without waiting for completion of the requested process, as in the second method. Then, upon occurrence of the status to be notified in the process that is being executed by the middleware layer 70 and the hardware layer 80, the event notification portion 62 transmits the message (the notification) including the status information indicating the status to the presentation layer 40 according to the WebSocket protocol even with no notification request. In other words, the status notified with the third method is the status of the process executed in response to the process request. In the transmission of the notification with the third method, for example, the "Number of pages" in the number information C11 illustrated in FIG. 3A is incremented each time the copied image is formed on the medium.

In the fourth method, upon occurrence of the status to be notified, the event notification portion 62 transmits the message (the notification) including the status information indicating the status to the presentation layer 40 according to the WebSocket protocol even with no notification request, regardless of the presence of the process request from the presentation layer 40. In other words, the status notified with the fourth method is not related to the process executed in response to the process request. For example, any presentation layer 40 the session of which with the information processing apparatus 10 is established according to the WebSocket standard may be the notification destination in the fourth method. In the information processing system 1, the status, such as "out of toner", "out of sheet", or "open container (the state in which the container storing the media, such as the sheets, is opened), is defined so as to be notified with the fourth method. The status notified with the fourth method may be varied with the presentation layer 40 (the display apparatus 4), which is the notification destination.

As described above, when the third method and the fourth method are used, the event notification portion 62 actively performs the notification (performs so-called push-type notification) regardless of the presence of the requests (the process request and the notification request) from the presentation layer 40. The event notification portion 62 notifies the presentation layer 40 of the result of the process and the statuses of other processes after the response to the process request when the third method is used and notifies the presentation layer 40 of the status of a predetermined process when the fourth method is used.

When the second method and the third method are used, the reception and response portion 61 or the event notification portion 62 transmits the result of the process and the statuses of other processes after the response to the process request. The three methods: the first to third methods are methods to notify the presentation layer 40 of the status of the requested process. In the present exemplary embodiment, the presentation layer 40 specifies the method (that is, any of the first to third methods) of transmitting the status of the process (including the result of the process) when the presentation layer 40 submits the request for the process. For example, the transmission method may be specified with the parameter included in the process request generated by the device control portion 42. The reception and response portion 61 and the event notification portion 62 transmit the response and/or the notification using the method specified by the presentation layer 40.

In the present exemplary embodiment, the status information is generated by the middleware layer 70 and is supplied to the reception and response portion 61 or the event notification portion 62. The status information may be generated by the function portion 65, the reception and response portion 61, or the event notification portion 62. The status information to be supplied to the event notification portion 62 may be supplied to the event notification portion 62 via the reception and response portion 61 without being directly supplied from the middleware layer 70 (or the function portion 65) to the event notification portion 62.

Referring back to FIG. 8, the operation image management portion 63 manages the operation image to be transmitted to the presentation layer 40. The operation image DB 64 stores the operation image. The operation image management portion 63 supplies the operation image described above to the presentation layer 40 via the interface 50. The operation image management portion 63 stores the operation image (specifically, the image data indicating the operation image) and, upon reception of the operation image request via the interface 50, transmits the response including the operation image to the requester via the interface 50.

Upon reception of the operation image request from the user apparatus 20, the operation image management portion 63 transmits the operation image data to the user apparatus 20 in response to the operation image request. Upon reception of the operation image request from the operation apparatus 30, the operation image management portion 63 transmits the operation image data to the operation apparatus 30 in response to the operation image request. The operation image management portion 63 transmits the operation image data to the requesters (the user apparatus 20 and the operation apparatus 30) of the operation image in the above manner to supply the operation image to the requesters.

The function portion 65 is a module group for realizing the functions provided to the user by the information processing apparatus 10. Upon reception of the process request from the presentation layer 40 via the interface 50, the function portion 65 in the information processing apparatus 10 causes the middleware layer 70 to execute the process requested with the process request.

Figure 9:
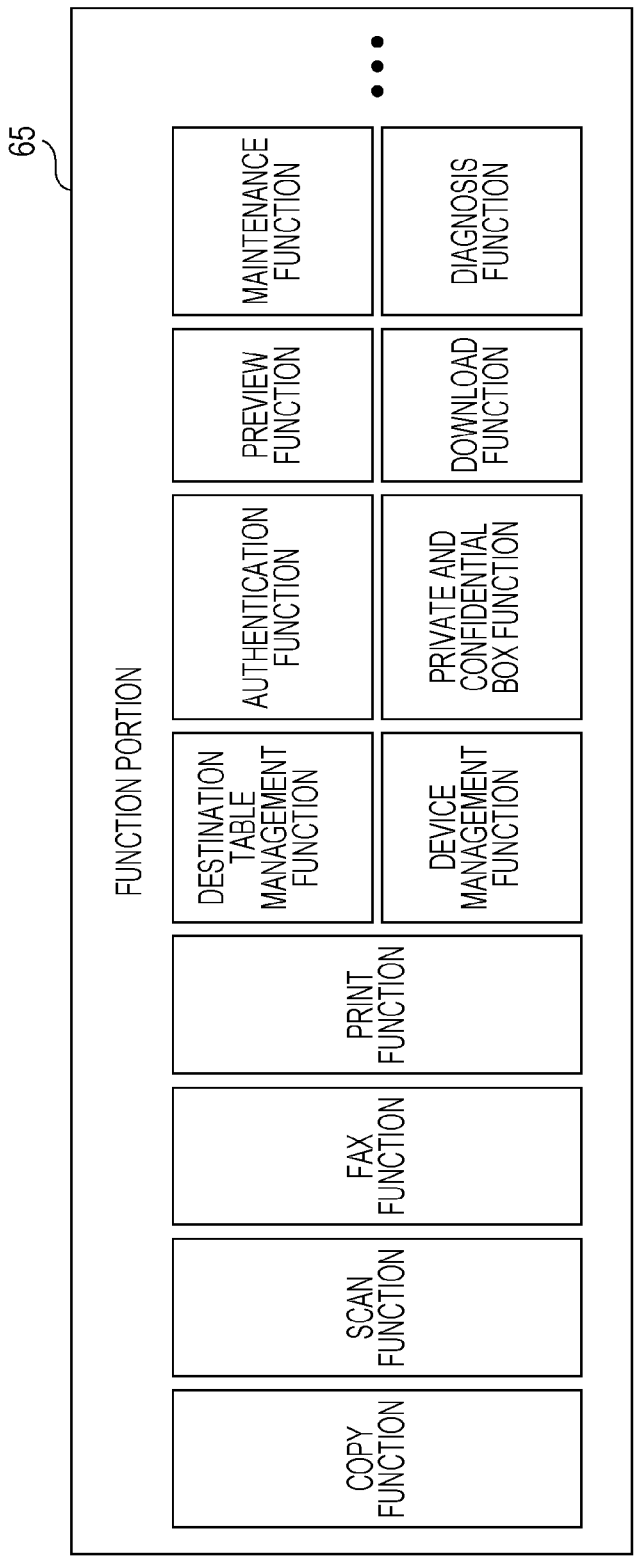
FIG. 9 illustrates an exemplary module group included in a function portion.

FIG. 9 illustrates an exemplary module group included in the function portion 65. The function portion 65 includes modules for realizing the copy function, the scan function, the FAX function, the print function, a destination table management function (a function to manage destination information), a device management function (a function to manage, for example, the document set state in the image reading unit 13 and the states of the medium, supplies, and so on in the image forming unit 14), an authentication function, a private and confidential box function (a function to manage electronic documents stored in the information processing apparatus 10), a preview function, a download function (a function to control update of programs), a maintenance function (a function to maintain the hardware in accordance with a remote request), and a diagnosis function (a function to diagnose the hardware).

The function portion 65 analyzes, for example, the directions included in the process request and causes the middleware layer 70 to execute the process in accordance with the content of the instructions that are analyzed. Specifically, the function portion 65 causes the middleware layer 70 to execute the directed process (for example, the copy process) with the directed parameters. The middleware layer 70 reads out an image from the medium, for example, with the image quality and the reading method set with operations by the user and forms the image that is read out in the output format, at the magnification, on the sheet, and in the color mode set with operations by the user.

The function portion 65 supplies the transaction ID supplied from the reception and response portion 61 to the middleware layer 70 when the function portion 65 instructs the middleware layer 70 to execute the process. The middleware layer 70 supplies the transaction ID to the reception and response portion 61 along with the status information described above.

The function portion 65 analyzes the description specifying the method (any of the first to third methods) described in the process request and transmits the analyzed method (that is, the method specified by the display apparatus 4) to the reception and response portion 61. The reception and response portion 61 or the event notification portion 62 transmits the XML data in which the status information supplied with the transaction ID is described to the communication destination associated with the transaction ID supplied from the function portion 65 according to the transmitted method. The reception and response portion 61 or the event notification portion 62 transmits the status of the process to the requester of the process using the specified method in the above manner. The function portion 65 may only supply the process request to the reception and response portion 61 and the reception and response portion 61 may analyze the specified notification destination.

The middleware layer 70 is a layer that executes a general-purpose process between the function layer 60 and the hardware layer 80. The hardware layer 80 is a layer that physically realizes, for example, the image reading process and the image forming process. The middleware layer 70 and the hardware layer 80 execute the various processes including the scan process, the FAX process, and the print process (the processes to provide the scan function, the FAX function, and the print function, respectively), in addition to the copy process described above. The copy process includes the image reading process by the image reading unit 13 illustrated in FIG. 6 and the image forming process by the image forming unit 14 illustrated in FIG. 6. The scan process includes the image reading process. The FAX process includes the FAX transmission process by the second communication unit 16. The print process includes the communication process by the first communication unit 15 and the image forming process. The scan process and the FAX process also include, for example, a data communication process using the second communication unit 16, a writing process to write data to the storage unit 12, and a reading process to read out data that is stored from the storage unit 12 depending on the method of acquiring the data and the method of outputting the data. Upon execution of the process, the middleware layer 70 and the hardware layer 80 supply the status information (the information indicating the status of the process that is being executed) to the function layer 60.

At least one of the reception and response portion 61, the event notification portion 62, the operation image management portion 63, the function portion 65, the middleware layer 70, and the hardware layer 80 illustrated in FIG. 8 is an example of the reception unit 102, the storage controller 103, and the image processing executer 104 illustrated in FIG. 7.

[1-5] Operations

[1-5-1] Transmission Operations of Status Information

Exemplary operations performed by the respective apparatuses in the transmission of the status information using the four methods: the first to fourth methods described above will now be described with reference to FIG. 12 to FIG. 15.

[1-5-1-1] First Transmission Operation of Status Information

FIG. 12 is a sequence diagram illustrating an exemplary operation of the respective apparatuses when the first method described above is used as the transmission method of the status information. The operation illustrated in FIG. 12 is started, for example, in response to an operation to update the parameter (the magnification, the sheet size, the color mode, etc.) for the copy process by the user before the copy process is performed. Referring to FIG. 12, in Step S111, the control unit 141 in the display apparatus 4 (the presentation layer 40) receives an operation to update the parameter. In Step S112, the control unit 141 in the display apparatus 4 (the presentation layer 40) transmits the XML data in which the request to update the parameter is described and which is included in the HTTP request to the information processing apparatus 10. Upon reception of the HTTP request, in Step S113, the reception and response portion 61 in the information processing apparatus 10 interprets the content of the received request. In Step S114, the reception and response portion 61 in the information processing apparatus 10 instructs the middleware layer 70 of the information processing apparatus 10 to execute the process with the interpreted content.

In Step S115, the middleware layer 70 executes the specified process, that is, updates the parameter in cooperation with the hardware layer 80. In Step S116, the middleware layer 70 supplies the information indicating the result of the process to the reception and response portion 61 as the status information. In Step S117, the reception and response portion 61 generates the XML data in which the supplied status information (the result of the update of the parameter in the example in FIG. 12) is described. In Step S118, the reception and response portion 61 transmits the HTTP response including the generated XML data to the display apparatus 4, which is the requester of the process. In Step S119, the control unit 141 in the display apparatus 4 displays the status information included in the transmitted HTTP response in the display unit 144 in the display apparatus 4.

[1-5-1-2] Second Transmission Operation of Status Information

Figure 13:
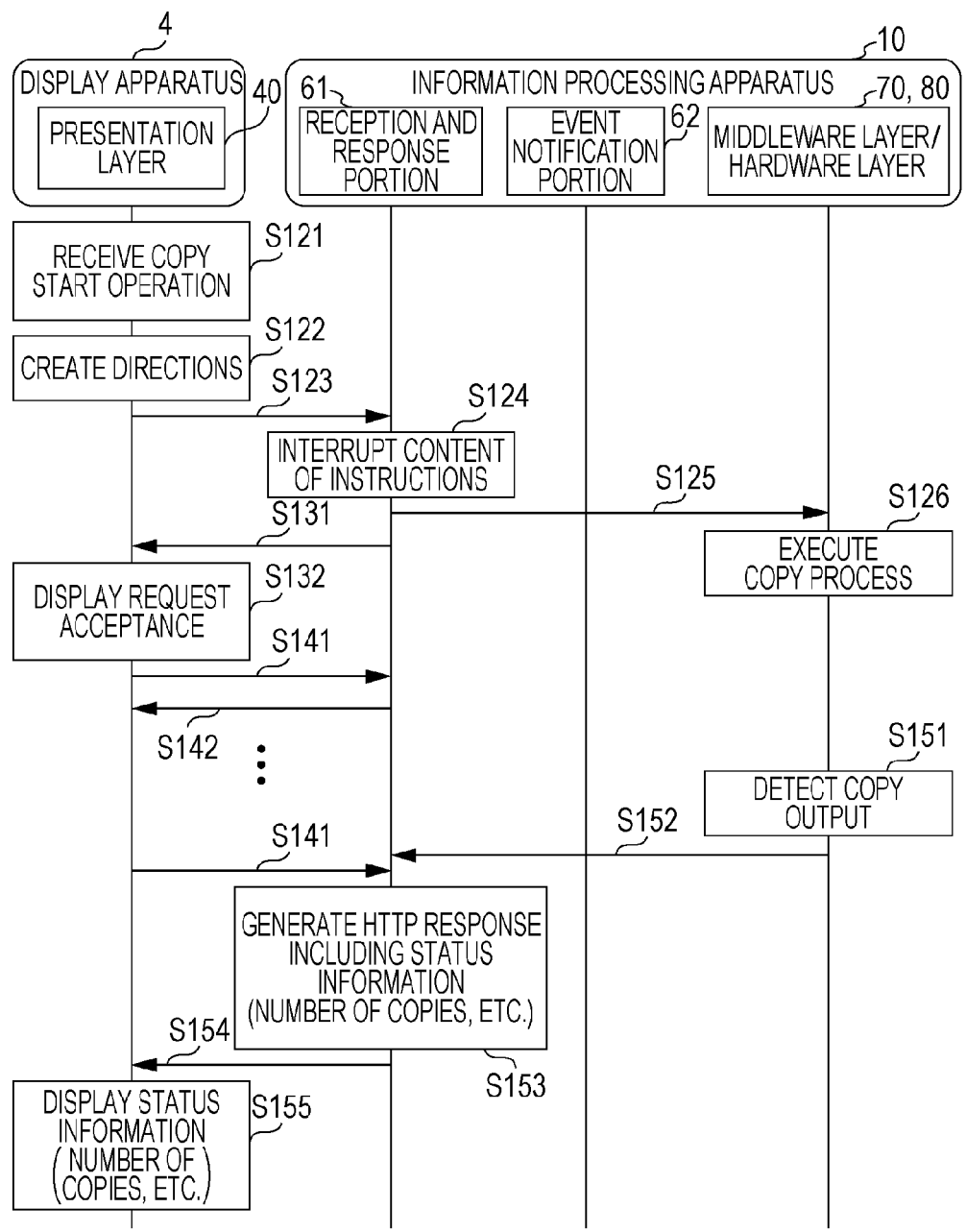
FIG. 13 is a sequence diagram illustrating an exemplary operation of the respective apparatuses when a second method is used.

FIG. 13 is a sequence diagram illustrating an exemplary operation of the respective apparatuses when the second method is used. The operation illustrated in FIG. 13 is started, for example, in response to setting of a document in the image reading unit 13 in the information processing apparatus 10 and an operation to cause the display apparatus 4 to start the copying by the user. Referring to FIG. 13, in Step S121, the control unit 141 in the display apparatus 4 receives an operation to start the copying. In Step S122, the control unit 141 in the display apparatus 4 creates the directions corresponding to the received operation. In Step S123, the control unit 141 transmits the process request (the HTTP request) including the created directions to the information processing apparatus 10. Upon reception of the process request via the interface 50 illustrated in FIG. 8, in Step S124, the reception and response portion 61 in the information processing apparatus 10 analyzes the directions included in the received process request to interpret the content of the instructions.

In Step S125, the reception and response portion 61 instructs the middleware layer 70 to execute the copy process on the basis of the interpreted content. In Step S126, the middleware layer 70 and the hardware layer 80 cooperatively execute the process based on the directed content (the copy process). After instructing the middleware layer 70 to execute the copy process, in Step S131, the reception and response portion 61 transmits the HTTP response indicating that the request for the copy process is received to the display apparatus 4 as the response to the HTTP request received in Step S123. In Step S132, the control unit 141 in the display apparatus 4 displays the content corresponding to the received HTTP response in the display unit 144 in the display apparatus 4. Step S131 may be executed before Step S124 or Step S125.

In the second method, the notification of the process status in response to the process request from the display apparatus 4 and the notification of the completion of the process are acquired by the display apparatus 4 through the polling with the HTTP request. After receiving the response to the request for the copy process, in Step S141, the control unit 141 in the display apparatus 4 transmits the notification request (the HTTP request) requesting the notification of the status of the copy process and thus performs the polling. If the status information about the copy process is not supplied, in Step S142, the reception and response portion 61 in the information processing apparatus 10 transmits the HTTP response indicating that the status information about the copy process is not supplied to the display apparatus 4. Step S141 and Step S142 are repeatedly executed.

In Step S151, the middleware layer 70 in the information processing apparatus 10 detects output of the copy (the image indicating the document that is read out) on the medium. In Step S152, the middleware layer 70 in the information processing apparatus 10 supplies the status information indicating the status in which the copy is output on the medium to the reception and response portion 61. After the status information is supplied, in Step S141, the reception and response portion 61 receives the notification request (the HTTP request). In Step S153, the reception and response portion 61 generates the HTTP response including the status information. In Step S154, the reception and response portion 61 transmits the generated HTTP response to the display apparatus 4. In Step S155, the control unit 141 in the display apparatus 4 displays the content corresponding to the HTTP response in the display unit 144 in the display apparatus 4, as in Step S132.

[1-5-1-3] Third Transmission Operation of Status Information

Figure 14:
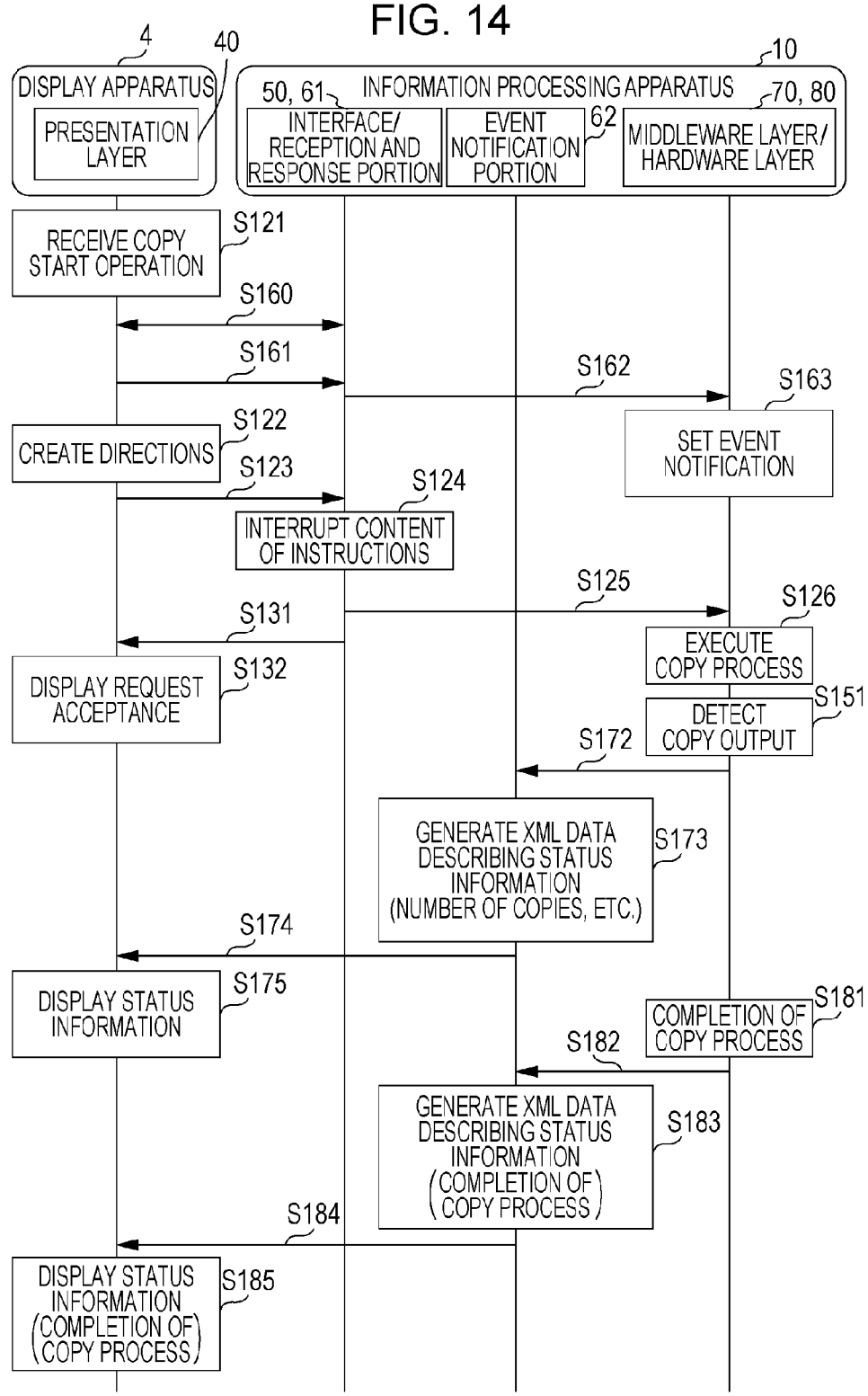
FIG. 14 is a sequence diagram illustrating an exemplary operation of the respective apparatuses when a third method is used.

FIG. 14 is a sequence diagram illustrating an exemplary operation of the respective apparatuses when the third method is used. The exchange of the data is performed between the display apparatus 4 and the information processing apparatus 10 according to the HTTP in the first method and the second method. In contrast, in the third method, the data is transmitted from the information processing apparatus 10 to the display apparatus 4 according to the WebSocket protocol, in addition to the HTTP. Specifically, the status information, which is acquired through the polling in the second method, is indicated to the display apparatus 4 as the WebSocket message in the third method. The second method and the third method realize one process in different methods and are selectively used.

The operation illustrated in FIG. 14 is started in response to the operation to start the copying by the user, as in the example illustrated in FIG. 13. Referring to FIG. 14, in Step S121, the control unit 141 in the display apparatus 4 receives the operation to start the copying. The control unit 141 in the display apparatus 4 executes a process to establish the WebSocket session with the information processing apparatus 10. Specifically, the control unit 141 transmits the HTTP request, which is a WebSocket handshake request, to the information processing apparatus 10. The HTTP request includes the client ID for identifying the display apparatus 4.

The interface 50 in the information processing apparatus 10 switches to the WebSocket on the basis of the HTTP request received from the display apparatus 4. In Step S160, the reception and response portion 61 transmits a WebSocket handshake response to the display apparatus 4 to establish the WebSocket session (hereinafter simply referred to as a "session") between the display apparatus 4 and the information processing apparatus 10. The timing when the session is established is not limited to the above timing. For example, the establishment of the session may be performed at timing when the user starts a Web browser using the display apparatus 4 to perform an operation to access the URL of the information processing apparatus 10.

The reception and response portion 61 stores the client ID included in the received HTTP request in a predetermined area (hereinafter referred to as a "cache area 12*a*") in the storage unit 12. The client ID stored in the cache area 12*a* is deleted from the cache area 12*a* when the session is normally disconnected. In other words, the client ID of the display apparatus 4 that is establishing the session with the information processing apparatus 10 and the client ID of the display apparatus 4 the session of which is disconnected during the process are accumulated in the cache area 12*a*.

In Step S161 and the subsequent steps, the display apparatus 4 and the information processing apparatus 10 exchange messages using the HTTP or the WebSocket protocol. When it is not necessary to discriminate between the messages transmitted and received using the HTTP and the messages transmitted and received using the WebSocket protocol, the messages transmitted and received using the HTTP and the messages transmitted and received using the WebSocket protocol are simply referred to as "messages" for description. The reception and response portion 61 in the information processing apparatus 10 stores the message which the information processing apparatus 10 has transmitted in the cache area 12*a* along with the client ID, the transaction ID, and a sequence ID added to the message. The sequence ID is identification information for identifying the message. The control unit 141 in the display apparatus 4 stores a pair of the transaction ID and the sequence ID added to the message received by the display apparatus 4 in a cache area (hereinafter referred to as a "cache area 142*a*") in the display apparatus 4. The cache area 142*a* may be provided in the storage unit 142 or may be provided in the RAM. The pair of the transaction ID and the sequence ID stored in the cache area 142*a* is referred to, for example, when the session is disconnected during the process.

Referring back to FIG. 14, upon establishment of the WebSocket session, in Step S161, the control unit 141 transmits the HTTP request including the XML data in which the application of the third method described above is described to the information processing apparatus 10. Upon reception of the HTTP request, in Step S162, the reception and response portion 61 in the information processing apparatus 10 transmits the content of the application described in the XML data included in the received HTTP request to the middleware layer 70. In Step S163, the middleware layer 70 receives the transmitted application and makes settings to subsequently transmit the status information using the third method to the display apparatus 4. The middleware layer 70 turns on, for example, a flag indicating whether the notification is made using the third method.

Then, Steps S122 to S126 and Steps S131 and S132 illustrated in FIG. 13 are performed. Then, in Step S151, the middleware layer 70 and the hardware layer 80 in the information processing apparatus 10 detect output of the copy. In Step S172, the middleware layer 70 and the hardware layer 80 in the information processing apparatus 10 supply the status information indicating the status in which the copy is output on the medium not to the reception and response portion 61 but to the event notification portion 62 because the above flog is turned on. In Step S173, the event notification portion 62 generates the XML data in which the supplied status information (the number of copies, etc.) is described. In Step S174, the event notification portion 62 transmits the generated XML data to the display apparatus 4 via the WebSocket session established in Step S160. In Step S175, the control unit 141 in the display apparatus 4 displays the content (for example, the status information C1 illustrated in FIG. 3A) described in the received data in the display unit 144 in the display apparatus 4.

In Step S181, the middleware layer 70 and the hardware layer 80 complete the copy process. In Step S182, the middleware layer 70 and the hardware layer 80 supply the status information indicating that the copy process is completed to the event notification portion 62. In Step S183, the event notification portion 62 generates the XML data in which the status information is described (for example, the XML data including a character string "Copy is completed."). In Step S184, the event notification portion 62 transmits the generated XML data, which is included in the WebSocket message, to the display apparatus 4. In Step S185, the control unit 141 in the display apparatus 4 displays the content described in the XML data received in Step S184 (for example, the status information C2 illustrated in FIG. 3B) in the display unit 144 in the display apparatus 4.

[1-5-1-4] Fourth Transmission Operation of Status Information

Figure 15:
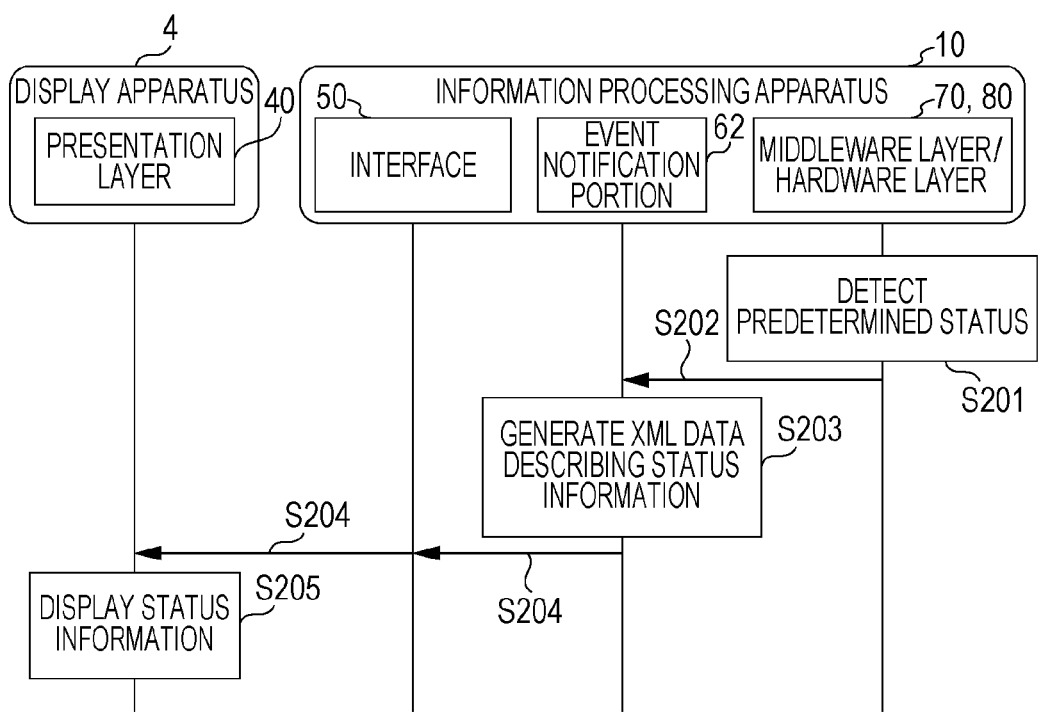
FIG. 15 is a sequence diagram illustrating an exemplary operation of the respective apparatuses when a fourth method is used.

FIG. 15 is a sequence diagram illustrating an exemplary operation of the respective apparatuses when the fourth method is used. The display apparatus 4 is notified of the status information according to the WebSocket protocol in the fourth method. In the fourth method, the WebSocket session that is established in advance, for example, the session established in Step S160 in FIG. 14 is used. Upon occurrence of a predetermined status (for example, out of toner, out of sheet, or open container), in Step S201, the middleware layer 70 and the hardware layer 80 in the information processing apparatus 10 cooperatively detect the predetermined status. In Step S202, the middleware layer 70 and the hardware layer 80 in the information processing apparatus 10 supply the status information indicating the detected status to the event notification portion 62. In Step S203, the event notification portion 62 generates the XML data in which the supplied status information is described. In Step S204, the event notification portion 62 transmits the generated XML data to the display apparatus 4 via the interface 50 through the established WebSocket session. In Step S205, the control unit 141 in the display apparatus 4 displays the status information described in the XML data received in Step S204 in the display unit 144 in the display apparatus 4.

As described above, different display apparatuses 4 may be notified of different statuses. In such a case, before Step S201, the control unit 141 transmits the XML data, in which the status to be indicated to the display apparatus 4 is described, to the information processing apparatus 10 via the communication portion 43. The event notification portion 62, which receives the XML data via the interface 50, stores the status to be indicated to the display apparatus 4 in association with the destination of the display apparatus 4. The event notification portion 62 makes the notification of the status if the status information supplied in Step S202 indicates the status to be indicated, which has been stored, to the display apparatus 4.

[1-5-2] Directions Storage and Image Processing Execution Process

An example of an operation to store the directions and an operation to execute the directed image processing by the information processing apparatus 10 will now be described. In this example, the user sets a document in the image reading unit 13 in the information processing apparatus 10 and performs an operation to cause the display apparatus 4 to start the copying. Upon reception of the operation to start the copying, the control unit 141 in the display apparatus 4 creates the directions (the XML data) corresponding to the received operation. In this example, the image forming unit 14 creates the directions in a first data format or a second data format.

FIGS. 16A and 16B illustrate exemplary directions. FIG. 16A illustrates an example of the directions directing the copy process in the first data format. FIG. 16B illustrates an example of the directions directing the copy process in the second data format. In the directions in the second data format in the example in FIG. 16B, a value indicating the second data format is set in a predetermined header area. In the second in FIG. 16B, a value "StandardJob" is set in a header area "jt:Framework." The value set in the header area is referred to in the information processing apparatus 10 to identify the format of the directions. The description format of the body part of the directions in the first data format may be different from that in the second data format.

In the examples in FIGS. 16A and 16B, the first data format is a format in which one piece of image processing or the flow of a series of multiple pieces of image processing is described. Specifically, for example, the directions specifying a series of pieces of processing "to perform a character recognition process for image data that is scanned and store the data indicating the result of the character recognition process in multiple external storages" are created in the first data format. In contrast, the second data format is a format in which one piece of image processing (for example, the copy process) is specified. It is not possible to describe the flow of the series of multiple pieces of image processing in the second data format.

If the process specified by the user includes multiple pieces of image processing, the control unit 141 creates the directions in the first data format indicating the specified process. If the process specified by the user does not include multiple pieces of image processing, the control unit 14 creates the directions in the first data format or the second data format.

FIG. 17 is a flowchart illustrating an exemplary process of storing the directions and executing the directed image processing by the information processing apparatus 10. The control unit 141 transmits the process request (the HTTP request) including the created directions to the information processing apparatus 10. The process illustrated in FIG. 17 is started in response to reception of the HTTP request from the display apparatus 4 by the information processing apparatus 10.

Upon reception of the HTTP request from the display apparatus 4, the control unit 11 in the information processing apparatus 10 interprets the directions included in the received HTTP request and thus interprets the content of the instructions. First, the control unit 11 determines whether the received directions are described in the first data format or the second data format. In this example, the control unit 11 identifies the format of the directions on the basis of whether a value indicating the second data format is set in a predetermined header area in the received directions. The image processing directed by the directions described in the second data format is called "standard processing" and the image processing directed by the directions described in the first data format is called "flow processing" in the following description for convenience. In this example, the data size of the directions of the flow processing is often larger than that of the directions of the standard processing.

Since the reading and writing speed of data in the RAM is higher than that in the storage unit 12 in the information processing apparatus 10, the RAM is used as a general rule and the RAM is continued to be used until the free space of the RAM is smaller than or equal to a predetermined size. When the free space of the RAM is made smaller than or equal to the predetermined size, the data is stored in the storage unit 12. However, if predetermined directions are received, the data is stored in the RAM even if the free space of the RAM is smaller than or equal to the predetermined size. The predetermined directions direct, for example, a preferably set process or a process in which the size of the directions may possibly be increased.

For example, when the size of the directions is variable because delivery is included in the directed image processing and multiple destinations are selectable, the size of the directions may possibly be increased. Since the size of the directions may possibly be increased if the attribute of the directed image processing does not meet a predetermined condition even when the standard processing has been directed, the received directions are stored in the RAM. The time required to read out the data is lengthened with the increasing size of the directions and this tendency is pronounced in the case in which the directions are stored in the storage unit 12, compared with the case in which the directions are stored in the RAM. Accordingly, the directions the size of which may possibly be increased are stored in the RAM, as described above, to cause the time required to read out the directions to be shortened (compared with the case in which the directions are stored in the storage unit 12). In contrast, if the attribute of the directed image processing meets the predetermined condition, for example, when the standard processing is directed and the free space of the RAM is sufficient, the received directions are stored in the storage unit 12. The operation of the control unit 11 when the directions are stored in the above manner will now be described with reference to the flowchart in FIG. 17.

Referring to FIG. 17, in Step S301, the control unit 11 determines whether the directed image processing is the standard processing or the flow processing. If the control unit 11 determines that the directed image processing is the flow processing (NO in Step S301), the process goes to Step S307 (the directions are stored in the storage unit 12). If the control unit 11 determines that the directed image processing is the standard processing (YES in Step S301), the process goes to Step S302. In Step S302, the control unit 11 calculates the free space of the RAM. In Step S303, the control unit 11 compares the free space of the RAM with a predetermined threshold value to determine whether the free space of the RAM is sufficient. If the control unit 11 determines that the free space of the RAM is sufficient (YES in Step S303), the process goes to Step S308. If the control unit 11 determines that the free space of the RAM is not sufficient (NO in Step S303), the process goes to Step S304.

In Step S304, the control unit 11 identifies the type of the process directed by the directions. The identification may be performed with reference to the value of the predetermined header area in the directions. In Step S305, the control unit 11 determines whether the identified type is a preferably set process type. Whether the identified type is a preferably set process type is based on reference by the control unit 11 to a preferably set table stored in advance in the storage unit 12.

Figures 18, 19:
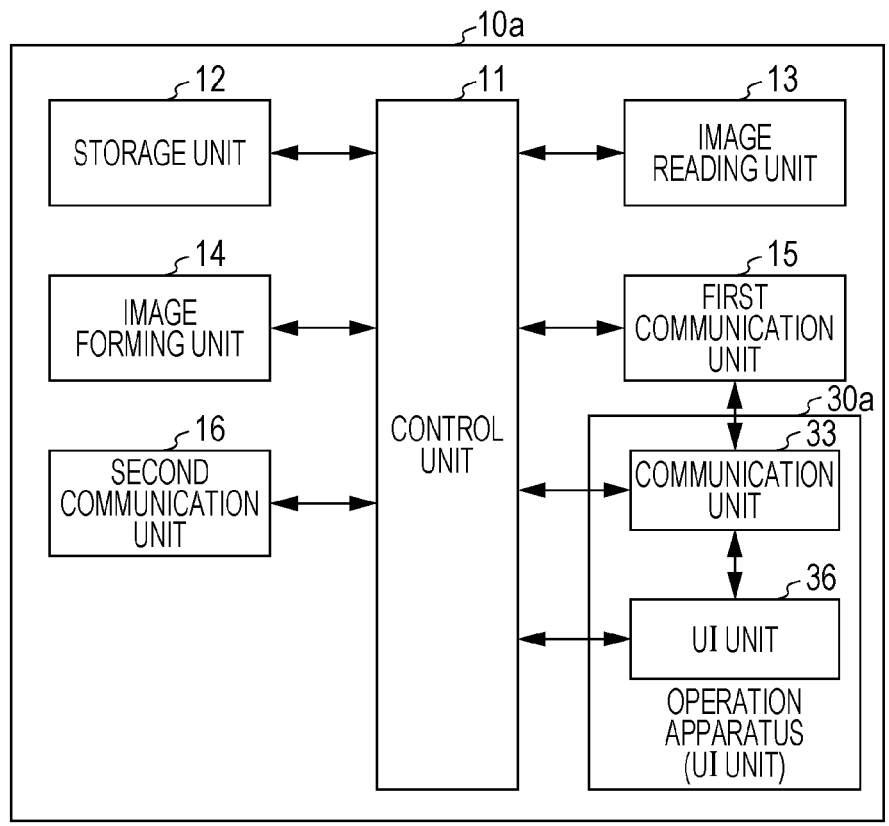
FIG. 18 illustrates an example of the content of a preferably set table.
FIG. 19 is a block diagram illustrating an exemplary hardware configuration of an information processing apparatus of a modification.

FIG. 18 illustrates an example of the content of the preferably set table. As illustrated in FIG. 18, items of "time zone" and "type" are stored in the preferably set table in association with each other. Among the items, data indicating the time zone is stored in the item "time zone." Data indicating the type of the image processing directed by the directions is stored in the item "type." In the example in FIG. 18, for example, data indicating a time zone "7:00 to 9:00" and data indicating "facsimile" are stored in the preferably set table in association with each other. In this case, the facsimile process is preferably executed in the time zone "7:00 to 9:00."

Referring back to FIG. 17, if the type identified in Step S304 and the time zone including the current time are stored in the preferably set table in association with each other, the control unit 11 determines in Step S305 that the directed image processing is preferably set. If the type identified in Step S304 and the time zone including the current time are not stored in the preferably set table in association with each other, the control unit 11 determines in Step S305 that the directed image processing is not preferably set. If the control unit 11 determines that the directed image processing is preferably set (YES in Step S305), the process goes to Step S308. If the control unit 11 determines that the directed image processing is not preferably set (NO in Step S305), the process goes to Step S306.

In Step S306, the control unit 11 determines whether the directed image processing is the process the size of the directions of which may possibly be increased. This determination is based on whether the type of the image processing is a predetermined type. If the control unit 11 determines that the directed image processing is the process the size of the directions of which may possibly be increased (YES in Step S306), the process goes to Step S308. If the control unit 11 determines that the directed image processing is not the process the size of the directions of which may possibly be increased (NO in Step S306), the process goes to Step S307. In Step S307, the control unit 11 stores the received directions in a predetermined storage area of the storage unit 12. In Step S308, the control unit 11 stores the received directions in the RAM. After Step S308, the process goes to Step S309.

In Step S309, the control unit 11 determines whether the image processing directed by the directions stored in the RAM in Step S308 is a process for which recovery is required. This determination may be based on, for example, whether the type of the image processing directed by the directions is a predetermined type. If the control unit 11 determines that the image processing is a process for which the recovery is required (YES in Step S309), the process goes to Step S310. In Step S310, the control unit 11 stores the copy of the directions stored in the RAM in the predetermined storage area of the storage unit 12. If the control unit 11 determines that the image processing is a process for which the recovery is not required (NO in Step S309), the process skips Step S310 and goes to Step S311.

In Step S311, the control unit 11 starts execution of the image processing directed by the directions in accordance with the directions stored in the storage unit 12 or the directions stored in the RAM. More specifically, the control unit 11 interprets the content of the directions, controls the image reading unit 13 and/or the image forming unit 14 on the basis of the interpreted content, and starts execution of the directed image processing (for example, the copy process). For example, if the data stored in the RAM disappears, for example, when the information processing apparatus 10 is turned off or due to power failure while the directed image processing is being executed, the control unit 11 restarts the execution of the image processing in accordance with the directions stored in the storage unit 12.

In the execution of the image processing using the directions, it may take an extremely long time to start the execution of the image processing directed by the directions when all the received directions are stored in the storage unit 12 or an externally-connected storage medium (for example, a memory card). In the present exemplary embodiment, at least part of the directions is stored in the RAM to suppress the lengthening of the time required to start the execution of the image processing.

In addition, for example, even if the information processing apparatus 10 is configured so as not have the hard disk drive, the storage of the directions in the RAM prevents the execution of the directed image processing from being disabled. In the present exemplary embodiment, the copy of the directions of the process for which the recovery is required is stored in the storage unit 12. Accordingly, the directed process is restarted by referring to the directions stored in the storage unit 12 even if the data stored in the RAM disappears.

[2] Modifications

The exemplary embodiments described above are only examples and may be modified in the following manners. The exemplary embodiments described above and the modifications described below may be appropriately combined, if needed.

[2-1]

The directions storage operation and execution operation in FIG. 17 are exemplified in the above exemplary embodiments, the directions storage operation is not limited to the one illustrated in FIG. 17 as long as the control unit 11 stores the received instruction data in the RAM if the attribute of the received instruction data (the directions) meets a predetermined condition and otherwise stores the received instruction data in the storage unit 12. In particular, if at least one attribute of the content of the image processing directed by the received instruction data, the free space of the RAM, the parameters included in the instruction data, the type of the data format of the instruction data, and the time when the instruction data is received meets a predetermined condition, the control unit 11 may store the received instruction data in the RAM.

Although the control unit 11 determines whether the recovery is required for the directions stored in the RAM and stores the copy of the directions in the storage unit 12 if the control unit 11 determines that the recovery is required in the above exemplary embodiments, the copy of the directions may not be stored in the storage unit 12.

Although the control unit 11 stores the received directions in the RAM or the storage unit 12 in the above exemplary embodiments, the directions may not be limitedly stored in the storage unit 12. For example, the control unit 11 may store the received directions in a storage medium (for example, an SD memory card) connected to the connection unit 17, instead of the storage unit 12. In particular, if the information processing apparatus 10 is configured so as not to have the storage unit 12, the control unit 11 stores the received directions in the RAM or the storage medium connected to the connection unit 17.

[2-2] Communication Standard

Although the user apparatus 20 includes the communication unit that performs the wireless communication according to the wireless LAN standard in the above exemplary embodiments, the user apparatus 20 may not include the communication unit that performs the wireless communication according to the wireless LAN standard and, for example, may include a communication unit that performs the communication according to the wired LAN standard, like the communication unit 33 in the communication device 3. In this case, the user apparatus 20 is connected to the router or the hub of the wired LAN via the communication cable. The communication unit in the user apparatus 20 in this case also functions as a communication unit that communicates with the other communication devices (the router and the hub) described above.

Although the first communication unit in the information processing apparatus 10 communicates with the communication unit in the operation apparatus 30 according to the wired LAN standard in the above exemplary embodiments, the wired LAN standard is not limitedly used. For example, the communication according to universal serial bus (USB) or High-Definition Multimedia Interface (HDMI) (registered trademark) may be performed or the wireless communication according to the wireless LAN standard, a Bluetooth (registered trademark) standard, or near field communication (NFC) may be performed. In any of the above cases, the communication unit in the operation apparatus 30 communicates with the first communication unit in the information processing apparatus 10 not via the other communication devices, such as the router or the hub. As described above, the communication unit in the operation apparatus 30 functions as a communication unit that communicates with the information processing apparatus 10 not via the other communication devices.

Although the information processing apparatus 10 exchanges data with the display apparatus 4 using the two communication protocols including the HTTP and the Web-Socket in the above exemplary embodiments, the communication protocols that are used are not limited to the above ones. The communication protocols used by the information processing apparatus 10 and the display apparatus 4 may include a first communication protocol used by the information processing apparatus 10 (the Web server) to transmit the response to the request transmitted from the display apparatus 4 (the Web client) and a second communication protocol for transmitting the notification from the information processing apparatus 10 to the display apparatus 4.

The information processing apparatus 10 may exchange data with the display apparatus 4 according to Simple Object Access Protocol (SOAP) in the above exemplary embodiments. The protocol used by the information processing apparatus 10 and the display apparatus 4 for the exchange of data is not limited to the above one. The information processing apparatus 10 may communicate with the display apparatus 4, for example, according to a Representational State Transfer (REST) standard or a Standard Generalized Markup Language (SGML) standard.

[2-3] Configuration of Operation Apparatus

Although the operation apparatus 30 includes the control unit, the storage unit, and the communication unit in the above exemplary embodiments, as illustrated in FIG. 5, the operation apparatus 30 may not include the control unit, the storage unit, and the communication unit.

FIG. 19 is a block diagram illustrating an exemplary hardware configuration of an information processing apparatus 10a of a modification. Among the components illustrated in FIG. 6, the information processing apparatus 10a including the components excluding the operation apparatus 30 and the connection unit 17 and an operation apparatus 30a are illustrated in the example in FIG. 19. Also in this modification, the operation apparatus 30a is fixed to the housing of the information processing apparatus 10a. The operation apparatus 30a includes the communication unit 33 illustrated in FIG. 5 and a UI unit 36.

The communication unit 33 and the UI unit 36 are connected to a bus in the information processing apparatus 10a to be controlled by the control unit 11. The communication unit 33 is also connected to the first communication unit 15. The UI unit 36 includes a display screen and a touch sensor superposed on the display screen. The UI unit 36 receives an operation by the user and displays an image. The UI unit 36 supplies the operation data corresponding to the received user's operation to the control unit 11 and the control unit 11 executes the process corresponding to the operation data. In this modification, the control unit 11 executes the programs of the browser to realize the functions of the display apparatus 4 illustrated in FIG. 7.

[2-4] Mounting of Operation Apparatus

Although the operation apparatus is fixed to the housing of the information processing apparatus in the above exemplary embodiments and the modification, the operation apparatus may not be fixed. For example, the operation apparatus, which is not fixed to the housing of the information processing apparatus, may be used as a remote controller.

Figure 20:
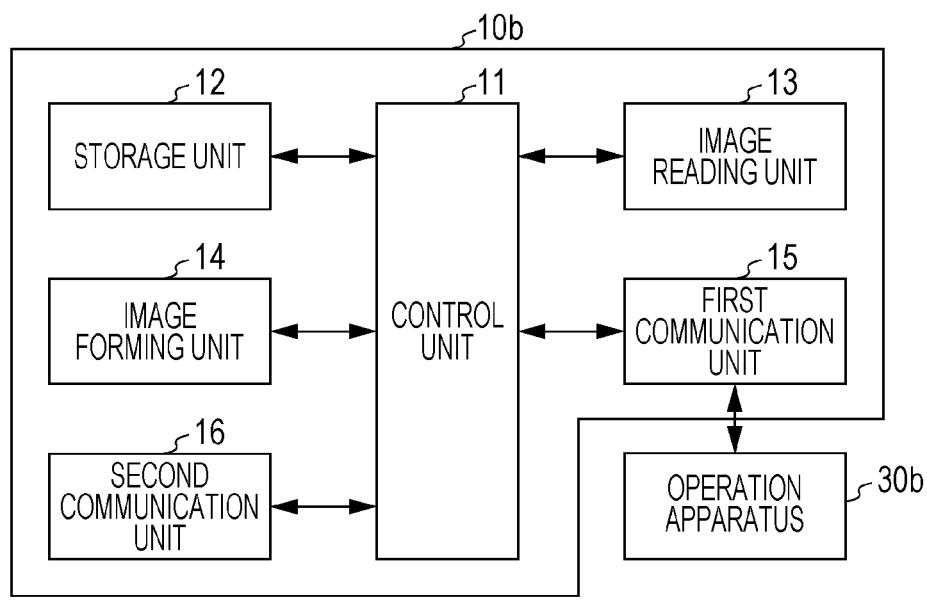
FIG. 20 is a block diagram illustrating an exemplary hardware configuration of an information processing apparatus of another modification.

FIG. 20 is a block diagram illustrating an exemplary hardware configuration of an information processing apparatus 10b of another modification. Among the components illustrated in FIG. 6, the information processing apparatus 10b including the components excluding the operation apparatus 30 and the connection unit 17 and an operation apparatus 30b are illustrated in the example in FIG. 20. The operation apparatus 30b includes the components illustrated in FIG. 5 and functions as the display apparatus 4 illustrated in FIG. 7. The housing of the information processing apparatus 10b includes a portion that is formed so that the operation apparatus 30b is capable of being mounted (hereinafter referred to as a "mounting portion").

The operation apparatus 30b is connected to the first communication unit 15 via a communication cable and is used by the user in a state in which the operation apparatus 30b is mounted in the mounting portion. The operation apparatus 30b is used as the local display apparatus 4 communicating with the information processing apparatus 10 not via the other communication devices, like the operation apparatus 30 in the above exemplary embodiments. The user may detach the cable from the operation apparatus 30b and may carry the operation apparatus 30b to another location for another application. In the example in FIG. 20, instead of the operation apparatus 30b, another apparatus functioning as an operation unit (for example, the user apparatus 20 illustrated in FIG. 1) may be connected to the information processing apparatus 10b. The operation apparatus 30b may be connected to the communication device 3 to cause the operation apparatus 30b to communicate with the information processing apparatus 10b via the communication device 3 and the communication line 2.

[2-5] Processes Executed by the Information Processing Apparatus 10

Although the operations when the copy process is executed are descried in the above exemplary embodiments, the process executed by the information processing apparatus 10 is not limited to the copy process. The process executed by the information processing apparatus 10 may be, for example, the image reading process or the image forming process described above.

[2-6] Method of Receiving Operation

Although the control unit 21 receives the operation by the user with the touch sensor in the above exemplary embodiments, the method of receiving the operation by the user is not limited to this. For example, when the display apparatus 4 is the tablet terminal, the operation by the user may be received with the buttons provided on the housing. When the display apparatus 4 is the personal computer, the operation by the user may be received with the keyboard and/or the mouse.

[2-7] Transmission of Message

Although the event notification portion 62 transmits the XML data conforming to the WebSocket standard in the above exemplary embodiments, the transmission by the event notification portion 62 is not limited to this. For example, the event notification portion 62 may keep the HTTP request transmitted from the UI control portion 41 in the display apparatus 4 using a technology called Comet and may transmit the status information as the response to the kept HTTP request upon occurrence of a message to be transmitted (for example, update of the status information). The status of the process is rapidly transmitted to the user with the method using Comet, as in the above exemplary embodiments, compared with the case in which the status information is transmitted as the response to the request from the operation apparatus.

[2-8] Category of the Invention

The present invention may be embodied as an information processing method for realizing the processes executed by the information processing apparatus, the display apparatus, the communication device, and the information processing system including these apparatuses, in addition to the information processing apparatus, the display apparatus, the communication device, and the information processing system including these apparatuses. The present invention may be embodied as a program causing computers of the information processing apparatus and the display apparatus to function as the units described above. The program may be provided in a mode of a recording medium, such as an optical disk, in which the program is stored. The program may be provided in a mode in which the program is downloaded to the computer via a communication line, such as the Internet, and is installed in the computer for usage.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a first memory configured to temporarily store data, the first memory having a data reading and writing speed which is higher than a data reading and writing speed of a second memory;
a reception unit configured to receive instruction data directing the image processing apparatus to perform image processing;
a storage controller configured to store the received instruction data in the first memory if an attribute of the received instruction data meets a predetermined first condition and, otherwise, store the received instruction data in the second memory; and
an image processing executing unit configured to execute the image processing indicated by the stored instruction data.

2. The image processing apparatus according to claim 1, wherein the storage controller is configured to store the received instruction data in the first memory if at least one of attributes including the received instruction data, a free space of the first memory, a parameter included in the received instruction data, a data format type of the received instruction data, and a time when the instruction data is received meets a predetermined condition.

3. The image processing apparatus according to claim 2, wherein the storage controller is configured to store the received instruction data in the first memory if an image processing type directed by the received instruction data is a predetermined type.

4. The image processing apparatus according to claim 1, wherein the storage controller is configured to store the received instruction data in the first memory if an image processing type directed by the received instruction data is a predetermined type.

5. The image processing apparatus according to claim 1, wherein the instruction data is described in a first data format specifying one piece of image processing or a flow of a series of a plurality of pieces of image processing or a second data format specifying one piece of image processing, and
wherein the storage controller is configured to store the received instruction data in the first memory if the received instruction data is described in the second data format.

6. The image processing apparatus according to claim 1, wherein the storage controller is configured to store the received instruction data in the first memory if an image processing type directed by the received instruction data and a time zone in which the instruction data is received are stored in a third memory that stores the image processing type and the time zone in association with each other.

7. The image processing apparatus according to claim 1, wherein the storage controller is configured to store a copy of the instruction data in the second memory if the attribute of the instruction data stored in the first memory meets a predetermined second condition.

8. A system comprising:
the image processing apparatus according to claim 1; and
an operation apparatus configured to transmit the instruction data to the image processing apparatus.

9. The image processing apparatus according to claim 1, wherein the storage controller is configured to store the received instruction data in the first memory in response to a delivery being included in the received instruction data and multiple destinations being selectable.

10. The image processing apparatus according to claim 1, wherein the storage controller is configured to store the received instruction data in the first memory in response to the flow of a series of multiple pieces of image processing being described in the received instruction data.

11. A non-transitory computer readable medium storing a program causing a computer to execute a process, the computer includes a first memory configured to temporarily store data, the first memory having a data reading and writing speed which is higher than a data reading and writing speed of a second memory, the process comprising:
receiving instruction data directing the computer to perform image processing;
storing the received instruction data in the first memory if an attribute of the received instruction data meets a predetermined condition and, otherwise, storing the received instruction data in the second memory; and
executing the image processing indicated by the stored instruction data.

12. An image processing method in an image processing apparatus including a first memory configured to temporarily store data, the first memory having a data reading and writing speed which is higher than a data reading and writing speed of a second memory, the image processing method comprising:
receiving instruction data directing the image processing apparatus to perform image processing;
storing the received instruction data in the first memory if an attribute of the received instruction data meets a predetermined condition and, otherwise, storing the received instruction data in the second memory; and
executing the image processing indicated by the stored instruction data.

* * * * *